(12) United States Patent
Blankenship

(10) Patent No.: US 10,954,887 B2
(45) Date of Patent: Mar. 23, 2021

(54) ENGINE TEST CELL FOR INTERMITTENT ENGINE TESTING

(71) Applicant: SYMBRIUM, INC., Raleigh, NC (US)

(72) Inventor: G. Wesley Blankenship, Raleigh, NC (US)

(73) Assignee: SYMBRIUM, INC., Raleigh, NC (US)

( * ) Notice: Subject to any disclaimer, the term of this patent is extended or adjusted under 35 U.S.C. 154(b) by 238 days.

(21) Appl. No.: 15/912,663

(22) Filed: Mar. 6, 2018

(65) Prior Publication Data
US 2018/0195462 A1 Jul. 12, 2018

Related U.S. Application Data

(63) Continuation of application No. 14/676,910, filed on Apr. 2, 2015, now Pat. No. 9,915,224.

(51) Int. Cl.
| | |
|---|---|
| *F02G 5/02* | (2006.01) |
| *G01M 15/14* | (2006.01) |
| *F01D 15/10* | (2006.01) |
| *F02C 6/18* | (2006.01) |
| *G01L 3/16* | (2006.01) |

(52) U.S. Cl.
CPC .............. *F02G 5/02* (2013.01); *F01D 15/10* (2013.01); *F02C 6/18* (2013.01); *G01M 15/14* (2013.01); *F05D 2260/83* (2013.01); *G01L 3/16* (2013.01); *Y02E 20/14* (2013.01); *Y02T 10/12* (2013.01)

(58) Field of Classification Search
CPC . F02G 5/00; G01L 3/16; Y02T 10/166; Y02E 20/14; F05D 2260/83
See application file for complete search history.

(56) References Cited

U.S. PATENT DOCUMENTS

| | | | | |
|---|---|---|---|---|
| 2,980,812 A | * | 4/1961 | Winther | G01L 3/22 310/93 |
| 5,571,975 A | * | 11/1996 | Smith, Jr. | G01L 3/20 188/296 |
| 8,371,251 B2 | | 2/2013 | Frick | |

(Continued)

OTHER PUBLICATIONS

Wikipedia; "Organic Rankine Cycle", http://en.wikipedia.org/wiki/Organic_Rankine_cycle; downloaded Feb. 4, 2015.

*Primary Examiner* — Eric S. McCall
*Assistant Examiner* — Timothy P Graves
(74) *Attorney, Agent, or Firm* — Thomas E. Lees, LLC

(57) ABSTRACT

An engine testing system comprises a rotary absorber that provides a variable resistance to an engine under test and heats coolant from a cold reservoir. A hot reservoir coupled to rotary absorber stores the heated coolant for later (or concurrent) use. Moreover, an organic Rankine cycle turbine-generator device is coupled to the hot reservoir, which converts heat from heated coolant into electrical power. A conditioning system is coupled to the organic Rankine cycle turbine-generator device that cools the coolant for storage in the cold reservoir. The available captured waste energy may be augmented with waste energy that is also available during engine testing. The additional waste energy may be in the form of exhaust gases, thrust, heat from engine coolant systems, residual engine heat, radiant or convective waste heat, friction etc. Variations of the above system may replace the primary energy re-capture from other than a rotary absorber.

8 Claims, 9 Drawing Sheets

(56) References Cited

U.S. PATENT DOCUMENTS

| | | |
|---|---|---|
| 8,931,277 B2 | 1/2015 | Peterson et al. |
| 2009/0179429 A1 | 7/2009 | Ellis et al. |
| 2012/0299311 A1* | 11/2012 | Biederman ............. F01K 25/08 |
| | | 290/40 B |
| 2014/0026574 A1* | 1/2014 | Leibowitz ............... F01K 25/08 |
| | | 60/651 |
| 2014/0116048 A1 | 5/2014 | Li et al. |
| 2014/0208751 A1* | 7/2014 | Bowan .................... F01K 7/165 |
| | | 60/647 |
| 2016/0084115 A1* | 3/2016 | Ludewig ................ F01K 25/08 |
| | | 60/651 |

\* cited by examiner

ENGINE TEST CELL FOR INTERMITTENT ENGINE TESTING

CROSS REFERENCE TO RELATED APPLICATIONS

This application is a continuation of U.S. patent application Ser. No. 14/676,910, filed Apr. 2, 2015, entitled "ENGINE TEST CELL", now allowed, the disclosure of which is hereby incorporated herein by reference.

BACKGROUND

Various aspects of the present disclosure relate generally to engine testing and more particularly to test facilities for testing engines, which capture waste energy from engine testing operations and transform the captured waste energy into usable energy.

When testing an engine, a load on a shaft of the engine may be simulated through the use of a loading device such as a rotary absorber, electrical generator, pump, or dynamometer. As an illustrative example, a rotary absorber is coupled to the shaft of the engine to supply a variable resistance (i.e., reactionary torque) to the shaft as the engine is operated. The amount of resistance supplied by the rotary absorber is controlled as part of the test operation to simulate the load. As the shaft of the engine turns, power transmitted through the shaft is (ultimately) converted to heat through the application of this resistance.

The manner in which the generated heat is removed from the testing system depends largely on the type of loading device. For instance, in many forms of mechanical rotary absorbers, a coolant carries heat energy away from the rotary absorber. The heated coolant is pumped to an evaporative cooler or some other heat exchanger device, where it is cooled. On the other hand, an electrical rotary absorber, such as an eddy current brake typically requires cooling for the generator windings, which is usually accomplished by liquid heat exchange. As another example, an air dynamometer dissipates heat directly to the atmosphere. As yet another example, an electrical generator or dynamometer produces electricity from shaft rotational energy that is routed to resistor banks.

BRIEF SUMMARY

According to aspects of the present disclosure, an engine testing system comprises a first energy conversion device that converts waste energy derived from intermittent engine testing operations into heat that heats a coolant. The engine testing system also comprises a second energy conversion device that converts waste energy derived from intermittent engine testing operations into usable energy, where the second energy conversion device operates independently of the first energy conversion device. The engine testing system also comprises a hot reservoir that stores the coolant heated as a result of the intermittent engine testing operations. Still further, the engine testing system comprises an electrical power generating device coupled to the hot reservoir, which converts heat extracted from the coolant stored in the hot reservoir into on-demand electrical power. The engine testing system yet further comprises a primary coolant loop that couples the coolant from the hot reservoir to the electrical power generating device.

According to yet further aspects of the present disclosure, an engine testing system comprises an electric generating device (e.g., a turbine-generator or a dynamometer) that coverts intermittent waste energy of an engine under test into electrical power. The engine testing system also comprises a hot reservoir, an Organic Rankine Cycle (ORC) turbine-generator device, and a primary coolant loop arranged such that heated coolant flows from the hot reservoir to the ORC turbine-generator device, which converts heat from heated coolant into electrical power. The engine testing system further comprises a resistive load coupled to the electric generating device that converts electrical energy from the electric generating device into heat that is utilized to heat the coolant.

According to certain aspects of the present disclosure, the resistive load may be implemented as a heating element that heats the coolant in the hot reservoir. Alternatively, the resistive load may be coupled to a heat exchanger that transfers heat from the resistive load to a heated working fluid. Here, a second loop transfers the heated working fluid to the ORC turbine-generator device.

According to yet further aspects of the present disclosure, an engine testing system for testing engines (e.g., internal combustion shaft engines) comprises a cold reservoir, a rotary absorber, a hot reservoir, an Organic Rankine Cycle (ORC) turbine-generator device, a conditioning system, and a control unit. The engine testing system also comprises a primary coolant loop arranged to enable coolant to flow from the cold reservoir to the rotary absorber, from the rotary absorber to the hot reservoir, from the hot reservoir to the ORC turbine-generator device, from the ORC turbine-generator device to the conditioning system, and from the conditioning system back to the cold reservoir.

In operation, the rotary absorber provides a variable resistance to rotation of a shaft of an engine under test during an intermittent engine testing operation, producing waste energy. Cool coolant (e.g., water, oil, or other form of heat transfer fluid) from the cold reservoir carries away the waste energy from the rotary absorber as heated coolant, which is provided to the hot reservoir via the primary coolant loop. The control unit is programmed to selectively determine when to supply heated coolant from the hot reservoir to the ORC turbine-generator device so as to convert heat from heated coolant into electrical power. The conditioning system conditions coolant from the ORC turbine-generator device for storage back in the cold reservoir.

DETAILED DESCRIPTION

According to aspects of the present disclosure, systems are provided for the testing of engines, such as conventional driven-shaft internal combustion engines, turbo-shaft jet engines, gas turbine engines, and thrust engines. In such engine testing systems, waste energy from intermittent engine testing operations is effectively captured and optionally stored. The collected waste energy is converted to useful energy, e.g., electrical power, upon demand over an extended period of time. For instance, electrical energy may be generated on the order of hours or even days after the testing operations have been performed and the waste energy collected.

When conducting tests on typical shaft engines, waste energy (e.g., relatively high power but low grade waste energy) is generated in the form of heat. According to certain embodiments described more fully herein, a coolant carries this heat away from the engine under test to a storage reservoir, referred to herein as a hot reservoir. The heat stored in the hot reservoir is converted to useful energy, e.g., electricity, on-demand by coupling the heated coolant from the hot reservoir to a turbine-generator device, such as an Organic Rankine Cycle (ORC) turbine-generator device, which converts heat to electricity. The coolant exiting the turbine-generator device can then be recycled to perform additional engine testing operations.

Intermittent engine testing operations may also generate other forms of waste energy. For instance, an engine testing operation may generate additional waste energy in the form of exhaust gases, thrust, heat from engine coolant systems, residual engine heat, radiant or convective waste heat, friction etc. As will be described in greater detail herein, in certain embodiments, this additional waste energy is captured as an alternative to, or for use in combination with, the collection of the above-described shaft waste energy. This other waste energy may be captured by heating a working fluid, by converting the waste energy directly into usable electrical power (e.g., using a turbine-generator), by extracting heated coolant from the engine under test, by combinations of the above, etc.

The electrical power generated by the engine testing system may be used to power various components of the engine testing system itself, such as pumps, conditioning systems, control units, heating elements, etc. Electrical power generated by the engine testing system may be used to power other devices not related to the engine testing system that are within the engine testing facility. Still further, electrical power generated by the engine testing system may be tied into a main power grid.

In this regard, electrical power generated by the engine testing system can be kept independent and isolated from power on the main power grid. Alternatively, power generated by the engine testing system may be provided to devices that share an electrical connection to the main power grid.

Figure 1:
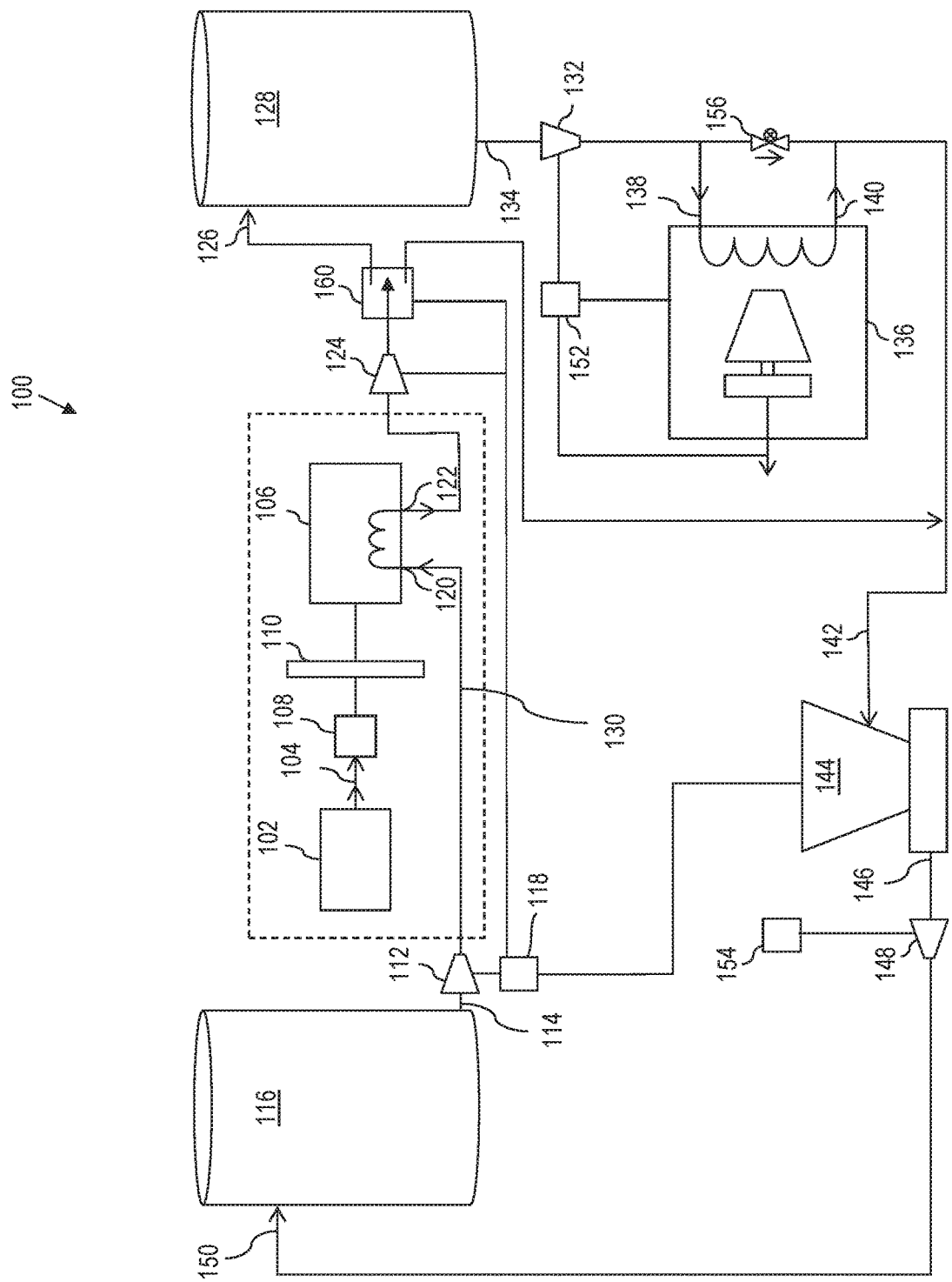
FIG. 1 is a block diagram of an engine testing system, according to various aspects of the present disclosure.

System Overview:

Referring to drawings and in particular FIG. 1, an engine testing system 100 is implemented as a test cell, as is shown in block diagram form. An engine 102 under test includes an output shaft 104 that couples to a loading device. Example engines 102 may comprise reciprocating piston engines, rotary or Wankel engines, gas turbine engines, turbo-shaft jet engines, turbo-prop jet engines, etc.

Primary Waste Energy Capture:

In certain embodiments, the loading device is a rotary absorber 106. In general, the rotary absorber 106 is a device that loads the engine 102 during testing and converts mechanical energy to heat energy, electrical energy, kinetic energy, or a combination of all three. For instance, the output shaft 104 of the engine 102 under test may directly drive the rotary absorber 106. Moreover, in some embodiments the output shaft 104 couples to the rotary absorber 106 through an optional intermediate device, such as a gearbox 108, a flywheel 110 (inertia wheel), or both. For instance, a gearbox 108 may be useful to match the engine output speed to the operational speed range for the rotary absorber 106. A flywheel 110 (inertia wheel) may be used to simulate the inertia of a device that the engine 102 was designed to power.

The rotary absorber 106 acts as an energy conversion device by converting waste energy derived from intermittent engine testing operations (shaft power) to heat that is carried away by a coolant (e.g., water, oil, or other form of heat transfer fluid). In certain embodiments, the rotary absorber 106 is implemented as a hydraulic brake. The hydraulic brake is referred to as a water brake when the coolant is water. In other embodiments, the rotary absorber 106 is implemented as an eddy current brake, friction brake, or other suitable absorber technology.

In some embodiments, the loading device is implemented as an electrical generator or dynamometer that is coupled to the engine shaft thus converting rotational energy to electricity that is then routed to a resistor bank or other electrical load device where the electrical energy is converted to heat. The resistor bank or electrical load device may be air or liquid cooled. Thus, the electrical generator or dynamometer, when configured as above with the load device being liquid cooled, can be considered an indirect form of liquid cooled rotary absorber 106. The particular type of rotary absorber 106 will likely vary depending upon the loading requirements of the engine under test.

As illustrated, a cool-coolant pump 112 is utilized to supply cool coolant from an outlet 114 of a cold reservoir 116 to the rotary absorber 106. In some embodiments, a control unit 118 is connected to, and controls the cool-coolant pump 112 to regulate the amount of coolant supplied to a coolant inlet 120 of the rotary absorber 106. Heated coolant exits the rotary absorber 106 via a coolant outlet 122, and is delivered via an optional heated-coolant pump 124 to a hot reservoir inlet 126 of a hot reservoir 128. In some embodiments, the heated-coolant pump 124 is controlled by the control unit 118 or by some other control unit (not shown). In this manner, a first section of a primary coolant loop 130 is utilized to transfer cool coolant from the cold reservoir 116 to the rotary absorber 106, and to transfer coolant heated by the rotary absorber 106 to the hot reservoir 128 during intermittent engine testing operations. The primary coolant loop 130 will be described in greater detail herein.

In practical implementations, the rotary absorber 106 can be implemented as a direct mounted rotary absorber 106 that is mounted directly to the engine 102 under test. Alternatively, the rotary absorber 106 can be implemented as part of a stationary driveline consisting of a permanently mounted rotary absorber 106 with optional flywheel, gearbox, etc. A direct mounted rotary absorber 106, e.g., engine mounted water brake, has certain advantages, in that the direct mounted rotary absorber 106 is much smaller and lighter than other forms of rotary absorbers 106, thus facilitating greater test cell availability.

In an illustrative implementation, the rotary absorber 106 may be prepped to an engine 102 outside of the test cell while another engine 102 is being tested in the test cell, thus increasing test cell availability. The ability to prep an engine 102 to a rotary absorber 106 is facilitated because the direct mounted rotary absorber 106 may be directly mounted to the output shaft 104 of the engine 102 under test. Yet further, the direct mounted rotary absorber 106 requires no complicated high-speed drivelines inside the test cell, thus facilitating modularity.

Moreover, fixtures to hold engines during tests are less complex than comparable fixtures used in connection with larger stationary electrical dynamometers or water brakes, facilitating easier loading, reduced maintenance and simpler calibration procedures. However, because the direct mounted rotary absorber 106 may have a low polar mass moment of inertia, it may be necessary to use analog or digital control methods to simulate inertia loading by commanding additional torque so that the engine 102 under test is subjected to desired loading when being accelerated or decelerated during a test procedure.

As shown in FIG. 1, there is only one cold reservoir 116. However, there may be any number of cold reservoirs 116 storing cool coolant for use by one or several rotary absorbers 106 located in multiple test cells. Similarly, in practice the hot reservoir 128 may be implemented as one or more hot reservoirs 128. Moreover, the hot reservoir 128 may be insulated or otherwise fabricated to retain the heat of the coolant stored therein. Further, the hot reservoir 128 may be elevated to increase potential energy of the coolant (e.g., to create head pressure), which may be recoverable at later times.

The sizes of the cold reservoir(s) 116 and the hot reservoir (s) 128 are determined based upon the engine testing needs. Generally however, testing can produce hot coolant that will remain at an elevated temperature sufficient to operate an ORC turbine-generator device (described later) for a period of time, e.g., several hours or longer, depending at least in part upon the temperature of the coolant and the amount of coolant stored in the hot reservoir 128.

The heated coolant remains in the hot reservoir 128 to preserve the heat until needed for use. When the heated coolant is needed (e.g., during or after testing), a heated-fluid bleed pump 132 bleeds the heated coolant through an outlet 134 of the hot reservoir 128 to feed an energy conversion device, e.g., an ORC turbine-generator device 136. More particularly, heated coolant enters the ORC turbine-generator device 136 through a fluid inlet 138 and exits the ORC turbine-generator device 136 via an outlet 140.

As explained in greater detail below, the ORC turbine-generator device 136 converts heat from the heated coolant from the hot reservoir 128 into electrical power. Power generated by the ORC turbine-generator device 136 can be used, for example, to power one or more components of FIG. 1 that draw power. Any component of the engine testing system 100 that may receive electrical power from the ORC turbine-generator device 136 may also be configured to receive power from an alternate source (e.g., an alternating-current feed from a facility power grid). Thus, when the ORC turbine-generator device 136 cannot supply enough power to the component, the component may draw power from the alternate power source. For instance, such may be the case during system start-up when power is needed to create flow prior to the ORC turbine-generator device 136 generating power.

As the ORC turbine-generator device 136 converts the heat from the heated coolant into electrical power, the heated coolant cools somewhat. Thus, the coolant that leaves the ORC turbine-generator device 136 is at a reduced temperature compared to the coolant that enters the ORC turbine-generator device 136. However, the coolant is likely not at a suitably cooled temperature for proper or efficient operation of many types of rotary absorbers 106. By way of example, in an embodiment using a water brake for the rotary absorber 106, the water coolant provided by the cold reservoir 116 must be less than 50 or 60 degrees Celsius in order to have effective heat transfer.

As such, the coolant may be further cooled before being returned to the cold reservoir 116 to be recycled to the rotary absorber 106 for subsequent testing. As such, the coolant passes to an inlet 142 of an optional conditioning system 144 that further conditions the coolant. For instance, after exiting the ORC turbine-generator device 136, the coolant may be lukewarm and unsuitable for optimal operation of the rotary absorber 106. Thus, for example, the conditioning system 144 may further cool the coolant (e.g., through a secondary heat exchanger) to create cool coolant for storage back in the cold reservoir 116.

The conditioning system 144 may also monitor and adjust the coolant for optimal system performance. Notably, the "'quality" of the coolant can have a profound impact on the longevity of the rotary absorber 106 from wear, corrosion, and other aspects. Many times, longevity can be increased by removing impurities, maintaining a desired pH (acidity) level, physical chemistry (shear characteristics), and by injecting small amounts of additives that inhibit corrosion and help lubricate the internal components of the rotary absorber 106 that may come in contact with the coolant such as rotors, shafts, bearings and seals. Thus in an example embodiment, the conditioning system 144 treats the coolant to: further cool the coolant, maintain a proper pH level of the coolant, maintain a proper lubricity of the coolant for use in the rotary absorber 106, remove any impurities that may be introduced into the coolant during the testing, provide deionization of coolant water, add lubricating agents, or combinations thereof. The monitoring and adjustments performed by the conditioning system 144 can be automated via control by the control unit 118, or via another suitable control device.

A cool-coolant fill pump 148 pumps the cool coolant from an outlet 146 of the conditioning system 144 to fill the cold reservoir 116 through an inlet 150 of the cold reservoir 116. Thus the engine testing system 100 is a closed system in regard to the coolant. The closed system is defined by the primary coolant loop 130, which provides a coolant passageway from the cold reservoir 116, through the rotary absorber 106, to the hot reservoir 128, through the ORC turbine-generator device 136, through the conditioning system 144, and back to the cold reservoir 116.

In an illustrative example, engine testing operations may be carried out intermittently throughout a day (e.g., intermittently on first and second shifts) at a facility based on testing requirements for that specific day while generating electrical power to meet instantaneous requirements of the facility. The heated coolant is thus collected and bled off as needed to the ORC turbine-generator device 136 to meet the power requirements (e.g., pumping, cooling, lighting, controls, etc., combinations thereof) of the engine testing system 100, other collocated engine testing systems at the testing facility, other devices at a facility, etc. For instance, in testing an example turbo-shaft jet engine, 10 to 25 kW or more of on-demand electricity may be generated continuously over a 24 hour period from a single test that was performed during a 3 hour period during the previous day. Higher levels of on-demand electricity can be generated for smaller periods of time. These levels of power can be readily absorbed by most test facilities over an extended time period without requiring surplus energy to be fed back to the main utility grid. Therefore, energy savings (i.e., the power generated from the waste heat recovered from engine testing operations) can be realized at the facility without having to comply with any restrictions imposed by local electrical utility authorities because none of the electrical power generated by the ORC turbine-generator device 136 needs to be fed back to the main power grid.

In an example implementation, to meet (or at least offset) the instantaneous power requirements of the facility, a control unit 152 determines an electrical load coupled to the ORC turbine-generator device 136. For example current sensors or facility energy monitors may be used to determine the needs of the testing facility and command the ORC turbine-generator device 136 to generate electricity as needed. The control unit 152 may also instruct or otherwise control the heated-fluid bleed pump 132 to supply heated coolant to the ORC turbine-generator device 136 based on the electrical load coupled to the ORC turbine-generator device, e.g., at a flow rate based on the electrical load. Further, the control unit 152 may determine the temperature of the heated coolant and further base the flow of heated coolant to the ORC turbine-generator device 136 on the temperature of the heated coolant. Similarly an optional control unit 154 may be provided to control the fill pump 148.

In practice the various control units 118, 152, 154 may be operated manually by a user. Alternatively, the control units may be automatic, such as where a specially programmed processor determines the electrical load, temperatures, pH levels, lubricity, flow rates, etc., and operates the components associated with the control units accordingly. Further, the control units 118, 152, 154 may be implemented separately, or one or more of the control units 118, 152, 154 may be combined into one control unit.

Further, the engine testing system 100 may include a bypass valve 156 in parallel to the ORC turbine-generator device 136. When the bypass valve 156 is in a first position, the bypass valve 156 directs the heated coolant from the hot reservoir 128 to the ORC turbine-generator device 136. Thus, during or after testing, hot coolant is pumped back through the ORC turbine-generator device 136 to the cold reservoir 116 as required creating on demand power. Comparatively, when in a second position, the bypass valve 156 directs the heated coolant from hot reservoir 128 to the conditioning system 144. Thus, when the bypass valve 156 is in the second position, the ORC turbine-generator device 136 is effectively removed from the closed loop of the primary coolant loop 130 (i.e., the engine testing system 100 does not perform cogeneration when the bypass valve 156 is in the second position). Thus, if there is not enough cool coolant to perform an engine test, and there is no demand for electrical power, the bypass valve 156 may be placed in second position (i.e., the bypass position) to draw coolant to replenish the cold reservoir 116.

Also, in certain embodiments, it is possible that at certain times, the coolant may not be heated sufficiently to warrant transfer to the hot reservoir 128. For instance, during test set up, during low torque testing, etc., the coolant exiting the rotary absorber 106 will be cool. Thus, to avoid adding cool coolant to the hot reservoir 128, a diverter valve 160 is used to divert the cool coolant to the conditioning system 144. Here, the control unit 118 or other suitable control unit controls the diverter valve 160. In an example implementation, a thermocouple or other temperature measurement device can provide a temperature measurement of the coolant to the control unit 118. Based upon the temperature (or other factors), the control unit 118 controls the diverter valve 160 to route the coolant to either the hot reservoir 128 or the conditioning system 144.

With the engine testing system 100, a user may test engines at different torque resistances and recover energy stored in the heated coolant at a later time. As mentioned above, the ORC turbine-generator device 136 may be used to supply power to other components of the engine testing system 100. As such, the heated coolant from one engine test may be stored in the hot reservoir 128 to power components of the engine testing system 100 during a later test. In some instances, the heated coolant from a test may be used to power components of the engine testing system 100 during that same test.

Modularity:

The engine testing system 100 (or other systems set out more fully herein) can be implemented in a modular form. Multiple cold reservoirs 116 and hot reservoirs 128 may be plumbed together to create additional capacity to accommodate more than one test per day or to accommodate more than one test cell. Capacity can be increased over time by adding reservoirs, ORC turbine-generator devices, heat exchangers, conditioners, etc. In larger facilities having multiple test cells, only a single test cell may be initially outfitted with all or portions of the above energy re-capture schemes. Additional test cells may be connected to the system over time. Likewise, additional energy re-capture methods may be implemented on specific test cells over time. Systems components such as heat exchangers, cold reservoirs, hot reservoirs, conditioning devices, ORC turbine-generator devices, etc., can be shared among test cells. In certain embodiments, a system controller is implemented to rout various test cells to various portions of the system accordingly to a logical schema. Facility utilization, facility energy consumption, facility energy savings and other performance criteria can be monitored and displayed.

Figure 2:
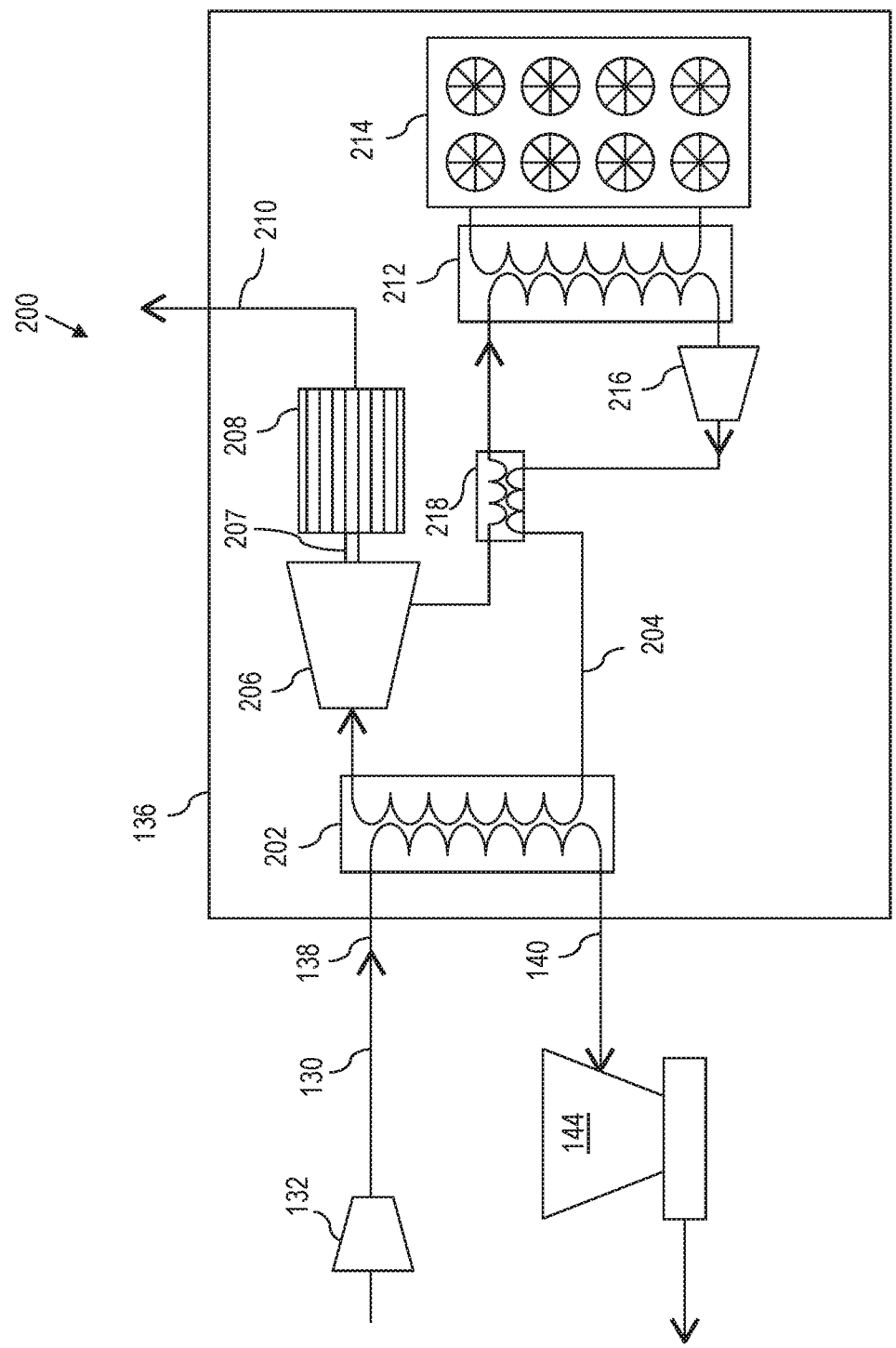
FIG. 2 is a block diagram illustrating an Organic Rankine Cycle (ORC) turbine-generator device, according to various aspects of the present disclosure.

Power Generation:

Referring now to FIG. 2, a block diagram 200 illustrates components of the ORC turbine-generator device 136. As mentioned above, heated coolant is pumped by the heated-fluid bleed pump 132 into the ORC turbine-generator device 136 through the fluid inlet 138 and leaves through the fluid outlet 140 at a lower temperature. Essentially, energy from the heated coolant pumped through the ORC turbine-generator device 136 is transferred via an evaporator 202 to an organic generator fluid. The evaporator 202 may be implemented as a first ORC liquid heat exchanger, such as an evaporator heat exchanger, that expands a condensed organic generator fluid based on heat from the heated coolant to create expanded organic generator fluid. The organic generator fluid is selected to have a low boiling temperature sufficiently below the working temperature range of the coolant. In this regard, the evaporator 202 expands the organic generator fluid, which changes the organic generator fluid from a liquid to a gaseous state inside the evaporator 202. The organic generator fluid then cycles through a closed ORC loop 204.

As illustrated, the expanded organic generator fluid exits the evaporator 202 and enters a turbine 206 via a generator-fluid inlet. Basically, the turbine 206 has a shaft 207 that rotates in response to the expanded coolant entering the turbine 206. More particularly, the turbine 206 may be implemented as a radial flow, centrifugal flow or other type of turbine designed to operate with the particular organic fluid within the operating temperature and pressure ranges. The turbine 206 converts the energy from the organic generator fluid to rotational mechanical energy that rotates the shaft 207 of the turbine 206. The rotation of the shaft 207 of the turbine 206 generates electrical power in a generator 208, and the power is output via an electrical output 210.

After leaving the turbine 206 via a generator-fluid outlet, the organic generator fluid enters a condenser 212 via an expanded-generator-fluid inlet, where the organic generator fluid is condensed back to a liquid state. For example, a second ORC heat exchanger 214 may be used to cool the organic generator fluid, which condenses the organic generator fluid. This second heat exchanger 214 may be a dry air heat exchanger that transfers additional heat to the atmosphere. Alternatively, if an external source of cooling is available such as cold water from a geothermal well, river, lake, ocean or other source, the heat exchanger 214 may be a water to liquid heat exchanger. Still further, other forms of cooling devices or heat exchangers 214 could be employed to condense the generating fluid. A recirculation pump 216 pulls the organic generator fluid from a condensed-fluid outlet of the condenser 212 into a generator-fluid inlet of the first evaporator 202 (first ORC heat exchanger), completing the ORC loop 204. This thermodynamic cycle is known as an "Organic Rankine Cycle."

A regenerator 218 is optionally used in the ORC loop 204 to reclaim heat before the organic generator fluid is condensed by the condenser 212. The regenerator 218 may be implemented as a third ORC heat exchanger such as a counter-current heat exchanger. The regenerator 218 preheats the organic generator fluid before it is expanded within the evaporator 202. In this regard, the ORC turbine-generator device 136 is made even more efficient.

The ORC turbine-generator device 136 uses a (preferably non-toxic) organic generator fluid such as a non-hydrofluorocarbon, fluorocarbon, etc., in the ORC loop 204 to convert heat from the heated coolant to electrical power. This organic generator fluid is specifically formulated to have properties that allow for optimal energy extraction within the operating temperature range of the stored coolant. Also, the organic generator fluid allows the ORC turbine-generator device 136 to generate electricity from the heated coolant (typically 60-94 degrees Celsius) whereas some power generating turbines require super-heated steam and function according to an ordinary Rankine cycle.

Because the primary coolant loop 130 is isolated from the ORC loop 204, the coolant and organic generator fluid never come into direct physical contact with each other. Instead, heat from the coolant is transferred to the organic generator fluid. Further, the neither the organic generator fluid nor the coolant are exposed to the atmosphere.

Additional Energy Capture Techniques:

When testing engines, heat may be derived in numerous forms, and is not limited to waste shaft energy. By way of example, when testing internal combustion engines, a combustible mixture of fuel (e.g., gasoline, kerosene, ethanol, etc.) and oxidant (e.g., atmospheric air, oxygen, etc.) provides the input energy to produce shaft energy (rotation and torque) or thrust necessary to perform useful work. However, typical internal combustion engines are inefficient, converting less than half of the input energy from the combustible fuel air mixture into useful work. The resulting waste energy is released in the form of convective or radiant heat directly from the engine, in the form of hot exhaust gases, or a combination thereof. Other mechanical losses, such as from friction are also typically present in these engines.

Also, when testing shaft power internal combustion engines, e.g., reciprocating piston engines, rotary or Wankel engines, gas turbines, turbo-shaft jet engines, and turbo-prop jet engines, exhaust gases having both heat and thrust are produced. In conventional systems, such exhaust gases contribute to $CO_2$ (greenhouse gas) and contain other toxic and non-toxic compounds and particulates that are atmospheric pollutants. Correspondingly, thrust engines, e.g., jet engines, turbo-fan jet engines, etc., produce thrust to perform the intended work. Here, fuel and air are converted to thrust that propels an aircraft or some other vehicle. However, according to various aspects of the present disclosure herein, conventionally wasted energy, e.g., including exhaust gases, convection, radiant heat, mechanical losses from friction, etc., can be captured by the engine testing system 100.

As will be described in greater detail herein, for certain types of internal combustion engines that have liquid cooling circuits, the coolant is directed to a heat exchanger which transfers the energy from the coolant to another coolant, e.g., heated water, which can be stored in a hot reservoir. As another example, thrust is converted to rotational mechanical energy by causing the exhaust gases to drive a turbine-generator that converts thrust energy to rotational shaft power that in turn drives a generator which produces electricity. Moreover, in example implementations, exhaust heat is collected by causing the exhaust gasses to be directed through a gas to liquid heat exchanger where the energy is transferred to a coolant. Accordingly, waste shaft energy, waste cooling energy and waste exhaust energy represent examples of energy that can be recaptured by the systems and methods herein.

Figure 3:
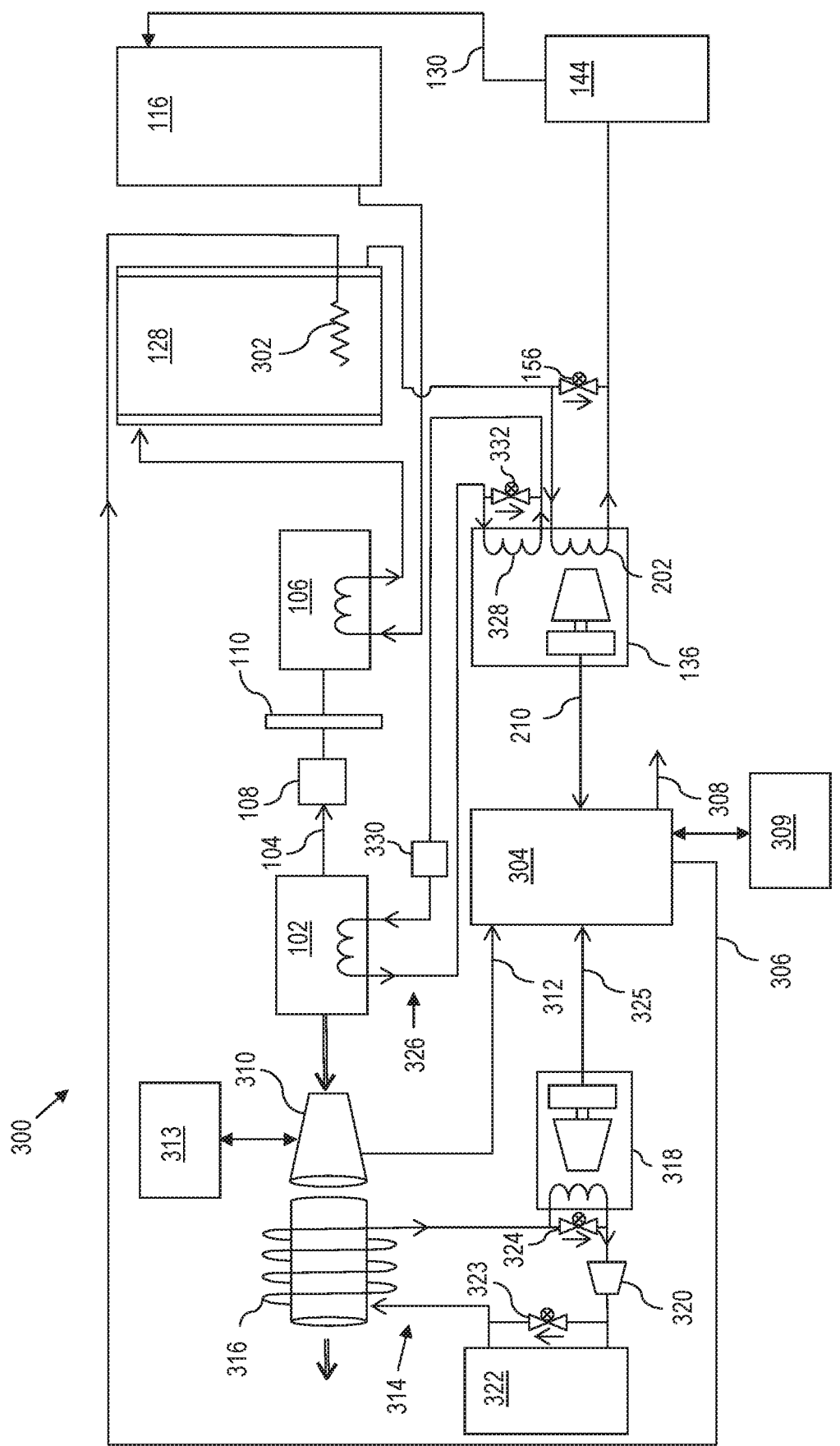
FIG. 3 is a block diagram illustrating of an engine testing system having supplemental cogeneration systems, according to various aspects of the present disclosure.

Example Energy Capture System Combination:

Referring to FIG. 3, a block diagram of an example engine testing system 300 illustrates several ways to reclaim waste energy from an engine test. The engine testing system 300 includes many of the same system components as the engine testing system 100 and thus all features described above are applicable and incorporated into the engine testing system 300. As such, like components are indicated with like reference numbers and the discussion of components from FIG. 1 is not repeated. Moreover, some components from FIG. 1 are omitted for clarity, but in practice, may be included in an implementation of the engine testing system 300.

Hot Reservoir Heating:

As illustrated in FIG. 3, in some, but not all embodiments, the engine testing system 100 of FIG. 1 is augmented by modifying the hot reservoir 128 to include a heating element 302 (e.g., a resistive heating element). The heating element 302 is coupled to one or more power sources through an electrical switch 304.

More particularly, a first circuit 306 electrically couples the electrical switch 304 to the heating element 302. A second circuit 308 electrically couples the electrical switch 304 to one or more (external) devices, e.g., to power components of the engine testing system 300, to power other components within the testing facility, to put power back on the main power grid, other desired use or combinations thereof. Moreover, the electrical switch 304 can be controlled by a control unit 309, e.g., a programmable logic controller (PLC), computer, or other processing device.

The control unit 309 is illustrated as a separate control device for sake of convenience in the block diagram, and to clearly illustrate the logical function of controlling aspects of the electrical switch 304. However, in some, but not all embodiments, all controllers logically illustrated herein, are implemented by a common, central controller. Thus, in these embodiments, the control unit 309 is integrated with other processing devices, such as any one or more of the control units 118, 152, 154, etc.

The electrical switch 304 can be controlled to operate in a first state where incoming electrical power is routed to the heating element 302 via the first circuit 306. The electrical switch 304 can be operated in a second state where incoming electrical power is routed to one or more devices via the second circuit 308. The electrical switch 304 may also be operated in a third state where incoming electrical power is routed to both the first circuit 306 and the second circuit 308. Still further, depending upon the sophistication of the electrical switch 304, electrical output may be routed to other outputs as the application dictates.

The electrical output 210 of the ORC turbine-generator device 136 can couple to the electrical switch 304, or the electrical output 210 of the ORC turbine-generator device 136 can be isolated from the electrical switch 304. However, there are certain advantages to connecting the electrical output 210 to the electrical switch 304. For instance, the electrical output 210 may be defined by a circuit from an electrical output of the ORC turbine-generator device 136 to the electrical switch 304 such that the ORC turbine-generator device 136 can provide electrical power to the first circuit 306, the second circuit 308, or both, depending upon a state of the electrical switch 304.

By way of example, there may be times when there is little or no demand for electricity, testing is necessary, and there is insufficient coolant in the cold reservoir 116 to facilitate testing. However, if the coolant in the hot reservoir 128 is sufficiently warm to operate the ORC turbine-generator device 136, the warm coolant is pumped to the ORC turbine-generator device 136 and the generated electricity is routed via the electrical switch 304 via the circuit 306 to the heating element 302 located inside the hot reservoir 128. Accordingly, coolant is drawn from the hot reservoir 128 to replenish the cold reservoir 116 via the primary coolant loop 130. Moreover, the coolant that remains in the hot reservoir 128 receives additional heat via the heating element 302. This is a form of regeneration and will improve the overall efficiency of the system in periods of low demand by not entirely wasting the stored energy by simply cooling the warm water without extracting any useful work. The volume of warm coolant is reduced but the temperature of the remaining coolant is increased.

Should the coolant in the hot reservoir 128 become too cool to operate the ORC turbine-generator device 136, the bypass valve 156 directs the lukewarm coolant directly to the conditioning system 144 (secondary heat exchanger) and back to the cold reservoir 116. Thus, the bypass valve 156, electrical switch 304, and other necessary devices are controlled by a system controller (e.g., control unit 309) that directs electricity to be used by the facility or for regenerative heating. Note here that coolant circulates through the primary coolant loop 130, as described with reference to FIG. 1.

Thrust Exhaust Heating:

As illustrated in FIG. 3, in some, but not all embodiments, the engine testing system 100 of FIG. 1 is augmented to capture exhaust gases, e.g., in the form of thrust such as when testing thrust engines or shaft engines which produce waste thrust as a by-product.

As illustrated, the exhaust of an engine 102 under test is directed to a turbine-generator system having a turbine-generator 310, which functions as an energy conversion device. The turbine-generator 310 generates electrical power using a flow of exhaust gases from the engine 102 while the engine 102 is running. As the gases pass through the turbine-generator 310, an internal turbine rotates, creating electrical power, which is directed toward the electrical switch 304 via a third circuit 312.

The electrical switch 304 can thus output the energy from the turbine-generator 310 as electricity via circuit 308. Also, when combined with the heating element 302 of the Hot Reservoir Heating embodiment described above, the electricity provided by the turbine-generator 310 can be directed by the electrical switch 304 via circuit 306 to the heating element 302 to provide additional heating of the coolant stored in the hot reservoir 128. Thus, the turbine-generator 310 receives exhaust gases from the engine testing operation and converts the exhaust gases into electrical power that is selectively coupled to the heating element 302 that heats the coolant in the hot reservoir 128.

In certain embodiments, the turbine-generator 310 is controlled by a control unit 313. For instance, the control unit 313 can receive feedback as to the temperature of the fluid stored in the hot-reservoir 128. If the temperature is above a predetermined threshold, and there is no demand for electricity, the control unit 313 can control turbine-generator 310 to not produce electricity. Alternatively, the control unit 313 can control the electrical switch 304 to re-route electricity provided via circuit 312 from the circuit 306, which feeds the heading element 302, to a different output.

The control unit 313 is illustrated as a separate control device for sake of convenience in the block diagram, and to clearly illustrate the logical function of controlling aspects of the turbine-generator 310. However, in practice, the control unit 313 may be integrated with, or otherwise implemented by the same control circuitry that controls the electrical switch 304, e.g., by integrating with the control unit 309. Still further, in illustrative aspects, all controllers logically illustrated herein, are implemented by a common, central controller. Thus, in these embodiments, the control units 313 and 309 are integrated with other processing devices, such as any one or more of the control units 118, 152, 154, etc.

Exhaust Loop Heating:

As illustrated in FIG. 3, in some, but not all embodiments, the engine testing system 100 of FIG. 1 is augmented to capture energy from exhaust gases. For instance, in an illustrative implementation, a separate exhaust heat system is defined by components within a high temperature coolant loop 314 (exhaust coolant loop). The exhaust coolant loop uses heat from the exhaust of an engine 102 under test as a source of energy for cogeneration. For instance, the exhaust heat system can include a gas to liquid heat exchanger 316 (e.g., an exhaust coil) that transfers waste energy in the form of heated exhaust gases from the engine testing operation, to heat that heats an exhaust coolant. The exhaust heat system also includes an exhaust electrical power generating device 318. Here, the high temperature coolant loop 314 couples the heated exhaust coolant from the gas to liquid heat exchanger 316 to the exhaust electrical power generating device 318, back to the gas to liquid heat exchanger 316. In this regard, the high temperature coolant loop 314 is a relatively higher temperature coolant loop that is separate and independent from the primary coolant loop 130.

The electrical power generating device 318 functions as an energy conversion device. For instance, the electrical power generating device 318 may be implemented as an ORC turbine-generator device (referred to herein as an exhaust ORC turbine-generator device), where the heat is used to expand an internal organic generator fluid of the exhaust ORC turbine-generator device in a manner analogous to the ORC turbine-generator device 136, described in greater detail with reference to FIG. 1 and FIG. 2. However, the temperature of the coolant exiting the heat exchanger 316 in the exhaust coolant loop 314 is likely to be significantly higher than the temperature of the heated coolant from the rotary absorber 106 in the primary coolant loop 130. Accordingly, the organic generator fluid internal to the exhaust ORC turbine-generator device will be different than the organic generator fluid in the ORC turbine-generator device 136. For instance, in an illustrative example, the organic generator fluid in the exhaust ORC turbine-generator device will function from about 150 to 1500 degrees Celsius or higher compared to a temperature range of 60-94 degrees Celsius for the organic generator fluid used by the ORC turbine-generator device 136.

In an alternative embodiment, the electrical power generating device 318 is implemented as a turbine-generator device. As such, the turbine-generator device need not be an ORC turbine-generator device, per se. For instance, in an illustrative embodiment, the coolant is gasified and superheated in the cooling loop. As such, the heated fluid can be used directly by the turbine, without using an evaporative heat exchanger such as the evaporator 202, described with regard to FIG. 2.

The coolant in the exhaust coolant loop 314 is pumped by an exhaust loop pump 320 back to the heat exchanger 316. Thus, as shown the exhaust coolant loop 314 is a closed loop system. Moreover as shown there is no storage of the coolant used in the exhaust coolant loop 314.

In a normal mode of operation, the exhaust coolant may not require further cooling after it exits the exhaust of the exhaust ORC turbine-generator device. For example, in efficient operation, there is no desire to waste already recovered waste energy. Thus, in the normal mode of operation, the exhaust coolant pump 320 pumps the coolant directly back to the exhaust heat exchanger 316. In embodiments where a secondary exhaust coolant heat exchanger 322 is provided in the exhaust coolant loop 314, the secondary exhaust coolant heat exchanger 322 is typically bypassed in the normal mode, e.g., using a diverter valve 323 switch that is set to a bypass position.

However, in some modes of operation, there may be no demand for electrical power. In some embodiments, the control unit 309 controls the electrical power generating device 318 to cool the exhaust coolant, but not to produce electricity, such as by disabling the turbine within the turbine-generator device. Here, the exhaust coolant heat exchanger 322 may not be required.

In other embodiments, the exhaust coolant is caused to bypass the exhaust ORC turbine-generator device by switching an optional bypass valve 324 to a bypass position. In this case, the coolant in the exhaust coolant loop 314 bypasses the exhaust ORC turbine-generator device 318 and is pumped by the exhaust loop coolant pump 320 to a secondary exhaust coolant heat exchanger 322 by switching the diverter valve 323 to a cooling (non-bypass) position. The secondary exhaust coolant heat exchanger 322 may be a dry-air heat exchanger or some other type of heat exchanger that ensures the exhaust loop coolant is at a sufficiently low temperature before entering the exhaust heat exchanger 316 (e.g., cooling coil) to avoid an over temperature condition.

Thus, by controlling the diverter valve 323 and the bypass valve 324, e.g., using a suitable controller such as control unit 309, the exhaust coolant can be utilized by the electrical power generating device 318, the secondary exhaust coolant heat exchanger 322, or a combination of the two. Here, the diverter valve 323 and the bypass valve 324 may be analogous to the bypass valve 156 described in greater detail with reference to FIG. 1. In an alternative embodiment where the secondary exhaust coolant heat exchanger 322 is not provided, the controller, e.g., control unit 309 may control the exhaust ORC turbine-generator device 318 to cool the exhaust coolant, but not to produce electricity, such as by commanding the generator within the ORC turbine-generator device to not produce electricity.

In normal mode, the generated electrical power from the exhaust ORC turbine-generator device 318 flows to the electrical switch 304 along a circuit 325. The electrical switch 304 can output the energy via circuit 308. Also, when combined with the heating element 302 of the Hot Reservoir Heating embodiment described above, the electricity provided by the exhaust ORC turbine-generator device 318 can be directed by the electrical switch 304 via circuit 306 to the heating element 302 to provide additional heating of the coolant stored in the hot reservoir 128. Thus if there is no demand for electricity, the recovered waste energy is stored as heat energy within the hot reservoir 128. Moreover, where both the turbine-generator 310 and the heat exchanger 316 are utilized, the electrical switch 304 can route electricity received via circuit 312 and via circuit 325 in any manner as set out more fully herein, either in combination, or independently. As such, the electrical switch 304 may route electricity to the circuit 306, to the circuit 308, or to both.

As shown in FIG. 3, in embodiments where both the turbine-generator 310 and the heat exchanger 316 are utilized, the heat exchanger 316 is after the turbine-generator 310 relative to the direction of flow of exhaust gases. However the heat exchanger 316 may be before the turbine-generator 310 relative to the flow of exhaust gases.

Engine Coolant Loop First Variation:

As illustrated in FIG. 3, in some, but not all embodiments, the engine testing system 100 of FIG. 1 is augmented to capture energy from engine coolant using a coolant loop 326 (engine coolant loop).

The engine 102 under test may utilize an engine coolant to keep the engine cool under normal operation. This coolant can be used to extract heat away from the engine 102, which can be captured and converted to usable energy. Basically, engine coolant heated by the engine 102 during a testing operation (e.g., via an engine heat exchanger) is conveyed via the engine coolant loop 326 to a secondary heat exchanger 328 provided within the ORC turbine-generator device 136. Thus, the components of the engine coolant loop 326 cooperate to define an energy conversion device. The secondary heat exchanger 328 is provided adjacent to the evaporator 202 of the ORC turbine-generator device 136 associated with the rotary absorber 106. As such, the organic generator fluid of the ORC turbine-generator device 136 may be expanded by the heated coolant circulating through the primary coolant loop 130, the engine coolant circulating through the engine coolant loop 326, or both. After heat is transferred from the engine coolant to the organic generator fluid of the ORC turbine-generator device 136, the engine coolant may be further processed by an optional conditioning system 330 before the engine coolant is sent back to the engine 102 under test. The conditioning system 330 can include features analogous to the conditioning system 144 described more fully herein, as the specific application dictates.

In some embodiments, the engine coolant will typically range below 140 degrees Celsius. As such, both the engine coolant loop 326 and the primary coolant loop 130 may use the same ORC turbine-generator device 136. Regardless, the engine coolant loop 326 may include a bypass valve 332 to remove the ORC turbine-generator device 136 from the engine coolant loop 326 in a manner analogous to the bypass valve 156 described with reference to FIG. 1.

Figure 4:
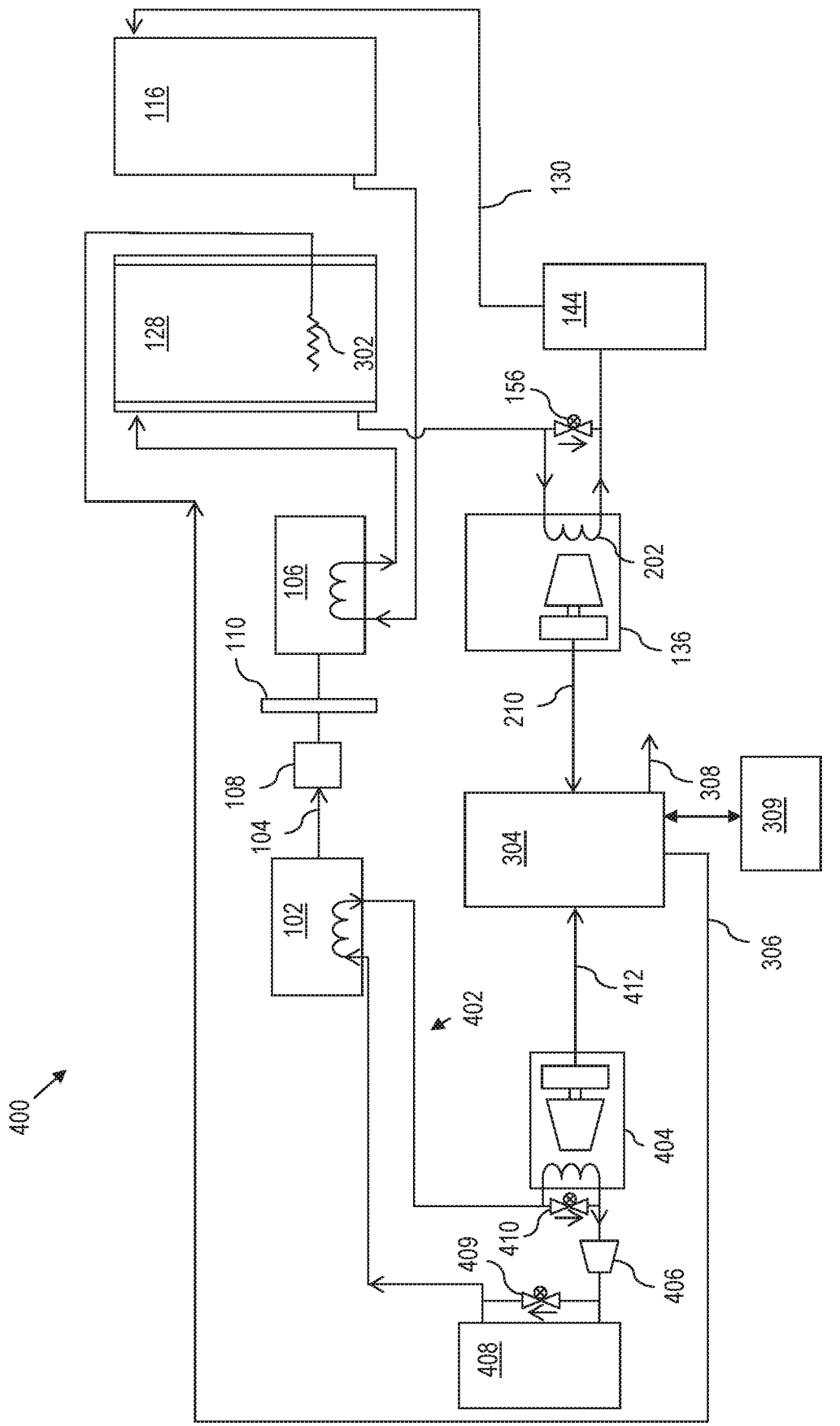
FIG. 4 is a block diagram illustrating another engine testing system having supplemental cogeneration systems, according to various aspects of the present disclosure.

Engine Coolant Loop Second Variation:

Referring to FIG. 4, in some, but not all embodiments, the engine testing system 100 of FIG. 1 and/or the engine testing system 300 of FIG. 3 is augmented as illustrated in the engine testing system 400 to capture energy from engine coolant using a coolant loop 402 (engine coolant loop). The engine testing system 400 includes many of the same system components as the engine testing system 100 and/or engine testing system 300, thus all features described above are applicable and incorporated into the engine testing system 400. As such, like components are indicated with like reference numbers and the discussion of components from FIG. 1 through FIG. 3 is not repeated. Moreover, some components from FIG. 1 through FIG. 3 are omitted for clarity, but in practice, may be included in an implementation of the engine testing system 400. In this regard, a practical implementation of the engine testing system 400 may include any one or more of the Thrust Exhaust Heating, Exhaust Loop Heating, and Engine Coolant Loop First Variation embodiments in addition to the components of the Engine Coolant Loop Second Variation as set out more fully herein.

This embodiment is largely analogous to the Engine Coolant Loop embodiment above in FIG. 3 except that the engine coolant loop 402 circulates heated coolant (from an engine heat exchanger) through a turbine-generator device (also referred to herein as an engine turbine-generator device 404) that is separate and distinct from the ORC turbine-generator device 136 used by the primary coolant loop 130. Thus, the components of the engine coolant loop 402 cooperate to define an energy conversion device.

Although not shown for sake of clarity, the engine testing system 400 can also optionally include the components and features described with reference to the Thrust Exhaust Heating embodiments, Exhaust Loop Heating embodiments, or a combination thereof.

The engine coolant loop 402 uses heat extracted from a heat exchanger of an engine 102 under test as a source of energy for cogeneration. For example, heated coolant from the engine 102 flows via the engine coolant loop 402 to an engine turbine-generator device 404. For instance, where the turbine-generator device 404 is an ORC turbine-generator device, the heat is used to expand an internal organic generator fluid of the exhaust ORC turbine-generator device in a manner analogous to the ORC turbine-generator device 136 described in greater detail with reference to FIG. 1 and FIG. 2.

In some embodiments, the coolant in the engine coolant loop 402 is pumped by an engine loop pump 406 back directly to the engine heat exchanger. However, in alternative embodiments, the coolant in the engine coolant loop 402 is pumped by the engine loop pump 406 to an optional engine coolant conditioning system 408 that conditions the coolant, whereupon the coolant is returned to the engine heat exchanger. The engine coolant conditioning system 408 implements one or more analogous functions as the conditioning system 144 of FIG. 1. As shown, the engine coolant loop 402 is a closed loop system. Moreover, as shown there is no storage of the coolant used in the engine coolant loop 402.

The generated electrical power from the engine turbine-generator device 404 flows to the electrical switch 304 along a circuit 412. The electrical switch 304 can output the energy as electricity via circuit 308. Also, when combined with the resistive heating element 302 of the Hot Reservoir Heating embodiment described above, the electricity provided by the engine turbine-generator device 404 can be directed by the electrical switch 304 via circuit 306 to the heating element 302 to provide additional heating of the coolant stored in the hot reservoir 128. Thus if there is no demand for electricity, the recovered waste energy is stored as heat energy within the hot reservoir 128.

In some embodiments, there may be no demand for electrical power. As such, the engine coolant is caused to bypass the engine turbine-generator device 404 by switching bypass valve 410 to a bypass position. In this case, the coolant in the engine coolant loop 402 is pumped by the engine loop pump 406 to the engine coolant conditioning system 408 (implemented as a secondary engine heat exchanger) by switching a diverter valve 409 to a cooling position. The engine coolant conditioning system 408 may be a dry-air heat exchanger or some other type of heat exchanger that ensures the engine loop coolant is at a sufficiently low temperature before entering the engine cooling coil to avoid an over temperature condition.

The diverter valve 409 and the bypass valve 410 are analogous to the diverter valve 323 and the bypass valve 324 described with reference to FIG. 3. In this regard, by controlling the diverter valve 409 and the bypass valve 410, e.g., using a suitable controller such as control unit 309, the engine coolant can be utilized by the engine turbine-generator device 404, the engine coolant conditioning system 408, or a combination of the two. In an alternative embodiment where the engine coolant conditioning system 408 is not provided, the controller, e.g., control unit 309 may control the engine turbine-generator device 404 to cool the exhaust coolant, but not to produce electricity, such as by disabling the turbine within the turbine-generator device.

Figure 5:
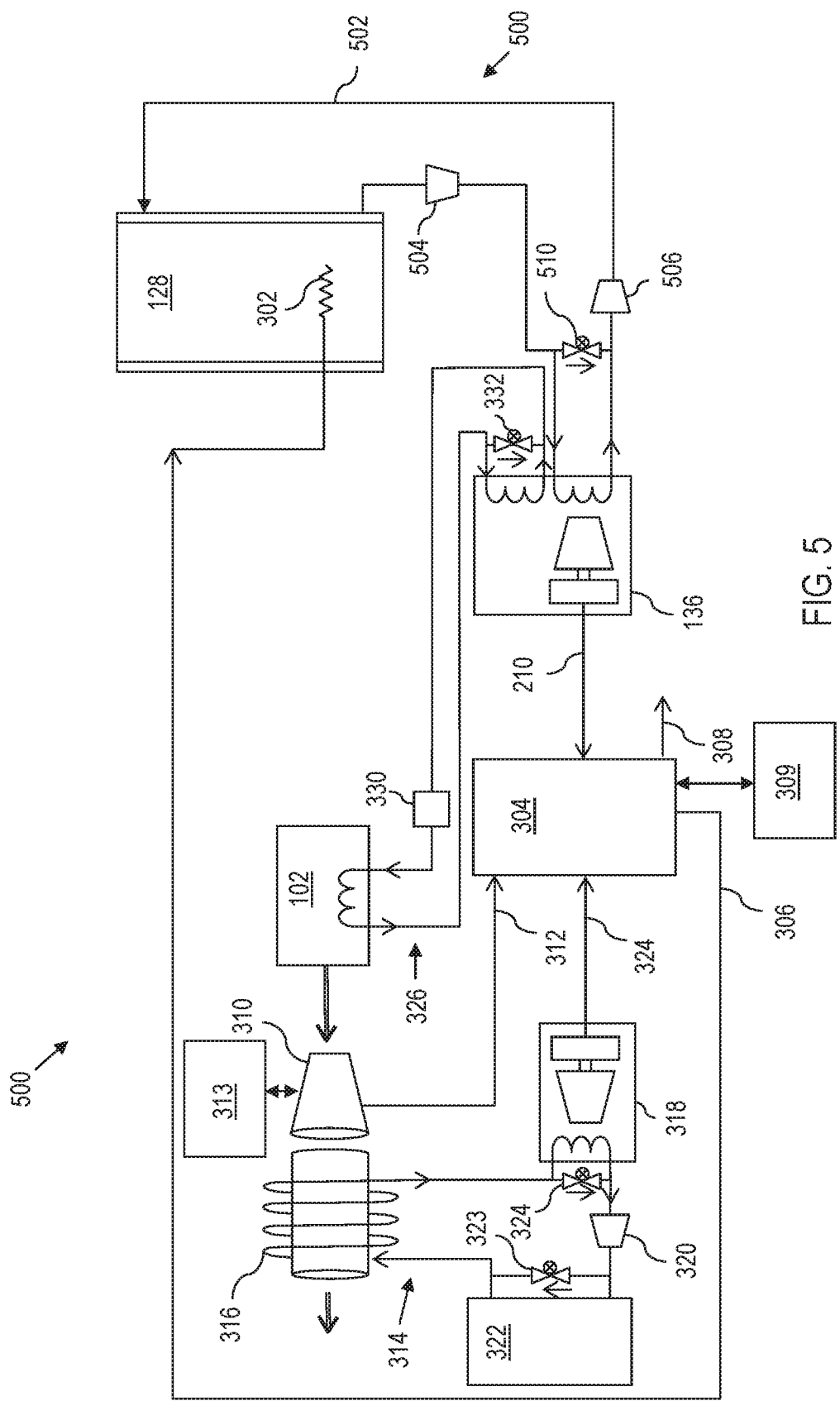
FIG. 5 is a block diagram illustrating yet another engine testing system having supplemental cogeneration systems, according to various aspects of the present disclosure.

Thrust Engine Capture:

Referring to FIG. 5, in some, but not all embodiments, the engine testing system 100 of FIG. 1, the engine testing system 300 of FIG. 3, the engine testing system 400 of FIG. 4, or a combination thereof, is augmented (or simplified) as illustrated in the engine testing system 500 to capture energy from a thrust engine. The engine testing system 500 includes many of the same system components as the engine testing system 100, engine testing system 300, engine testing system 400, or combinations thereof, thus all features described above are applicable and incorporated into the engine testing system 500. As such, like components are indicated with like reference numbers and the discussion of components from FIG. 1 through FIG. 4 is not repeated. Moreover, some components from FIG. 1 through FIG. 4 are omitted for clarity, but in practice, may be included in an implementation of the engine testing system 500.

The engine testing system 500 is well suited for testing thrust engines. Since there is no engine shaft that requires a load, there is no need for the rotary absorber 106 or cold reservoir 116 of the engine testing system 100 of FIG. 1. The conditioning system 144 of FIG. 1 may also be optionally omitted as well. In this regard, a practical implementation of the engine testing system 500 may include any one or more of the Thrust Exhaust Heating, Exhaust Loop Heating, Engine Coolant Loop First Variation, and Engine Coolant Loop Second Variation embodiments as set out more fully herein.

In the engine testing system 500, the primary coolant loop 502 runs from the hot reservoir 128 to a pump 504 that delivers the heated coolant to the ORC turbine-generator device 136. The coolant exits the ORC turbine-generator device 136 and is conveyed by pump 506 directly back to the hot reservoir 128. Here, the components of the primary coolant loop 502 cooperate to form an energy conversion device.

In this implementation, the ORC turbine-generator device 136 (e.g., via the engine coolant loop 326 or a reservoir loop 502), the turbine-generator 310, the exhaust ORC turbine-generator device 318, or combinations thereof, may be used to heat the hot reservoir 128 as described more fully herein, depending upon which one or more of the technologies are in the particular implementation of the engine testing system 500.

For instance, the engine testing system 500 may include a bypass valve 510, which operates in a manner analogous to the bypass valve 156 described more fully herein, to circulate heated coolant in the reservoir loop 502 back to the hot reservoir 128.

In certain testing operations, it may be undesirable to attempt to harness the thrust generated by the shaftless engine as electrical power, e.g., because to do so may interfere with the testing of the engine. However, the thrust can be used to provide heat to the coolant in the hot reservoir 128 via the circuit 306 and heating element 302. Moreover, the heat and gas flow of the exhaust may still be harnessed for electrical power of the shaftless engine, as described above.

In the engine testing system 500, the hot reservoir 128 is sized based upon estimated testing schedule usage and power demands. During testing, electricity can be diverted to the facility, e.g., via the circuit 308 and/or to the heating element 302 via the circuit 306, as required, in a manner analogous to that described more fully herein. As described in greater detail with regard to FIG. 3, there may be situations where there is no demand for electricity. In this regard, certain embodiments may be adjusted or otherwise configured, such as by bypassing the exhaust ORC turbine-generator device 318 using valve 324 and diverting the coolant through heat exchanger 322 using diverter valve 323. As yet another alternative, the controller (e.g., control unit 309) may command the generator to not produce electricity. As another example, the ORC turbine-generator device 136 may be routed to the electrical switch 304 such that electrical energy can be routed to the heating element 302.

Notably, in certain implementations waste energy from intermittent engine testing operations is used by a first ORC turbine-generator device 318 to heat coolant in a hot reservoir 128 so that the heated coolant can be extracted on demand or as otherwise needed to be used by a second ORC turbine-generator device 136 to generate on demand electricity that can be utilized by the corresponding facility, by the components of the testing engine testing system 500, fed back to the power grid, etc.

Figure 6:
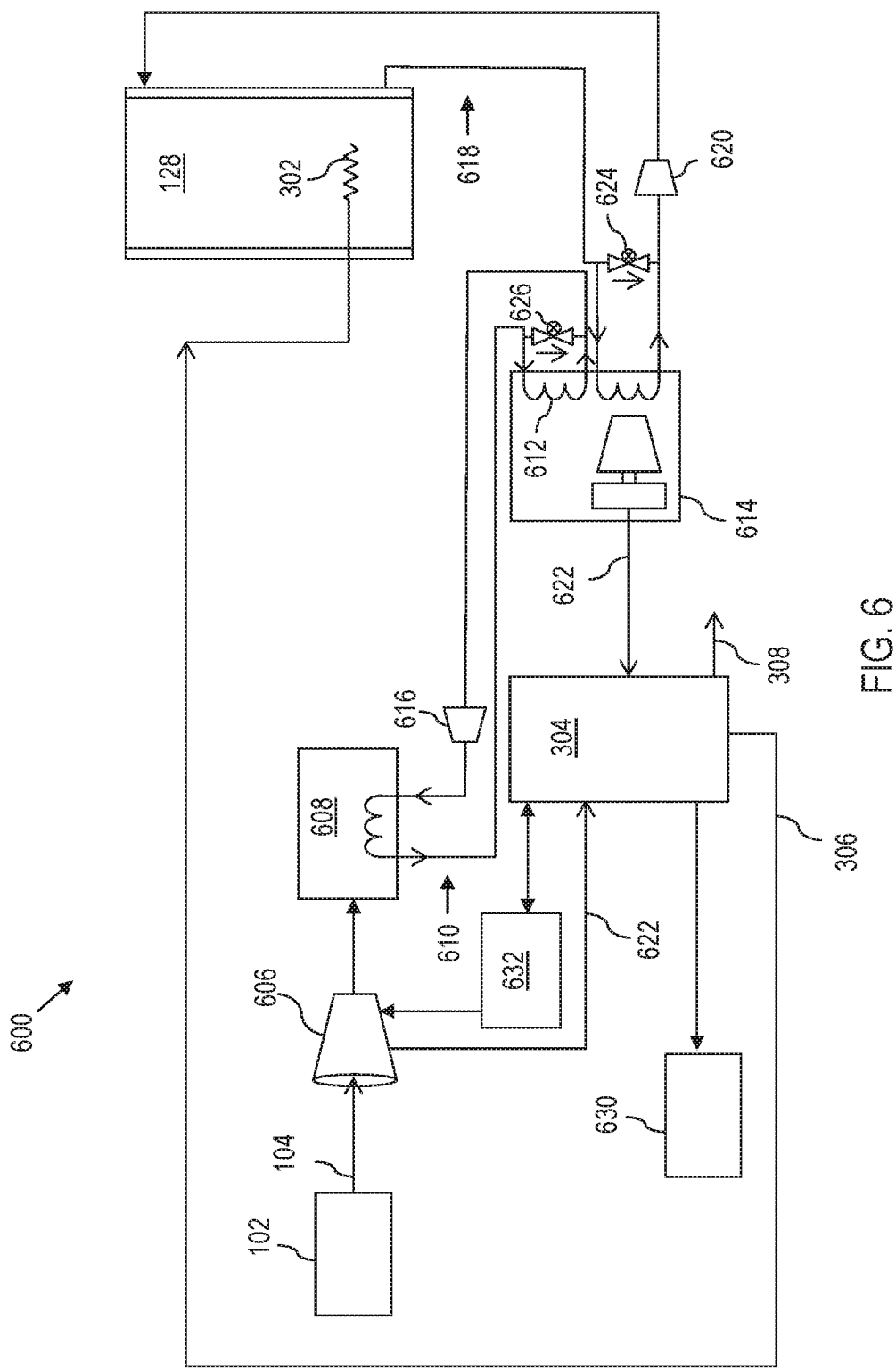
FIG. 6 is a block diagram illustrating yet another engine testing system using an electric generating device coupled to an engine under test, according to various aspects of the present disclosure.

Generator/Dynomometer:

Referring to FIG. 6, in some, but not all embodiments, the engine testing system 100 of FIG. 1, the engine testing system 300 of FIG. 3, the engine testing system 400 of FIG. 4, the engine testing system 500 of FIG. 5, or a combination thereof, is augmented as illustrated in the system 600 to capture energy from a using an electric generating device that converts shaft rotation to electrical energy. The system 600 includes many of the same system components as the engine testing system 100, engine testing system 300, engine testing system 400, engine testing system 500, or combinations thereof, thus all features described above are applicable and incorporated into the system 600. As such, like components are indicated with like reference numbers and the discussion of components from FIG. 1 through FIG. 5 is not repeated. Moreover, some components from FIG. 1 through FIG. 5 are omitted for clarity, but in practice, may be included in an implementation of the system 600. In this regard, a practical implementation of the system 600 may include any one or more of the Thrust Exhaust Heating, Exhaust Loop Heating, Engine Coolant Loop First Variation, and Engine Coolant Loop Second Variation embodiments as set out more fully herein.

In certain situations, a rotary absorber 106 may be a device that does not directly convert the rotational shaft energy to a form or heat that is carried away by a coolant. For instance, in an illustrative embodiment, the rotary absorber 106 is implemented as an electric generating device 606 that converts the shaft power from the rotation of the output shaft 104 of the engine 102 directly to electricity. In an example embodiment, the electric generating device 606 is implemented as an electric generator. In an alternative embodiment, the electric generating device 606 is implemented as an electric dynamometer. Regardless, an electrical load is applied to the output of the electric generating device 606 in order to produce resistance. Here, the electric generating device 606 and electrical load cooperate to define an energy conversion device.

In a first illustrative implementation, the electrical load 608 is implemented as a resistor bank with liquid or air heat exchange. In this example, a resistor bank loop 610 is used to circulate a working fluid from the resistance bank heat exchanger to a secondary heat exchanger 612 of an ORC turbine-generator device 614. A pump 616 is used to route the working fluid from the ORC turbine-generator device 614 back to the resistance heat exchanger associated with the resistor bank.

As with the Engine Coolant Loop First Variation example of FIG. 3 and/or the Thrust Engine Capture example of FIG. 5, a hot-reservoir 128 stores a heated coolant, which is also coupled to the ORC turbine-generator device 614 (analogous to the ORC turbine-generator device 136 discussed more fully herein) via a heated coolant loop 618. A pump 620 may be used to return the coolant back to the hot-reservoir 128. In this regard, the heated coolant of the heated coolant loop 618 is separate from, but in series with the working fluid of the resistor bank loop 610 within the ORC turbine-generator device 614. For instance, as schematically illustrated, the secondary heat exchanger 612 is provided adjacent to the conventional evaporator 202 of the ORC turbine-generator device 614. As such, the organic generator fluid of the ORC turbine-generator device 614 may be expanded by the heated coolant circulating through the resistor bank loop 610, the heated coolant loop 618, or both.

The output of the ORC turbine-generator device 614 may be provided via a circuit 622 to the electrical switch 304 described more fully herein. Alternatively, the output of the electric generating device 614 may be directed to other devices, or a combination of both as described previously.

Moreover, a bypass valve 624 may be provided to bypass the heated coolant in the heated coolant loop 618 from entering the ORC turbine-generator device 614. Similarly, a bypass valve 626 may be provided to bypass the working fluid in the resistor bank loop 610 from entering the secondary heat exchanger 612 of the ORC turbine-generator device 614. In a manner analogous to that described more fully herein, the bypass valve 624, bypass valve 626, or both may be controlled, e.g., via controller 632 to direct the flow of fluids according to the system requirements. In a manner analogous that described more fully herein, the controller 632 is shown logically as a separate feature. However, in practice, the controller 632 may be integrated with the control unit 309 or other controllers described more fully herein.

The system 600 can be simplified by omitting the electrical load 608, resistor bank loop 610, secondary heat exchanger 612, and pump 616. In this regard, the heating element 302 can serve as the resistive load by routing, the electric generating device 606 through the electrical switch 304 to the heating element 302. The system 600 can be simplified even further by omitting the electrical switch 304, thus routing the output of the electric generating device 606 directly to the heating element 302.

There may be times when there is no demand for electricity and the hot reservoir 128 is too hot (e.g., above a pre-determined threshold temperature). Under this scenario, power should be diverted, e.g., to a separate load bank 630. The load bank 630 may be air or liquid cooled by way of example. The load bank 630 may also be useful or otherwise required to facilitate emergency or sudden stops, or to prevent a run-away condition if the switch gear fails. Here, a controller 632 controls the electric generating device 606, the electrical switch 304, or a combination thereof to divert power to the load bank 630. The controller 632 can also be used to control the electric generating device 606, e.g., to turn the device on or off. In an analogous manner to that described more fully herein, the controller 632 may be part of a larger central control system, or the controller 632 may be a separate control device.

Figure 7:
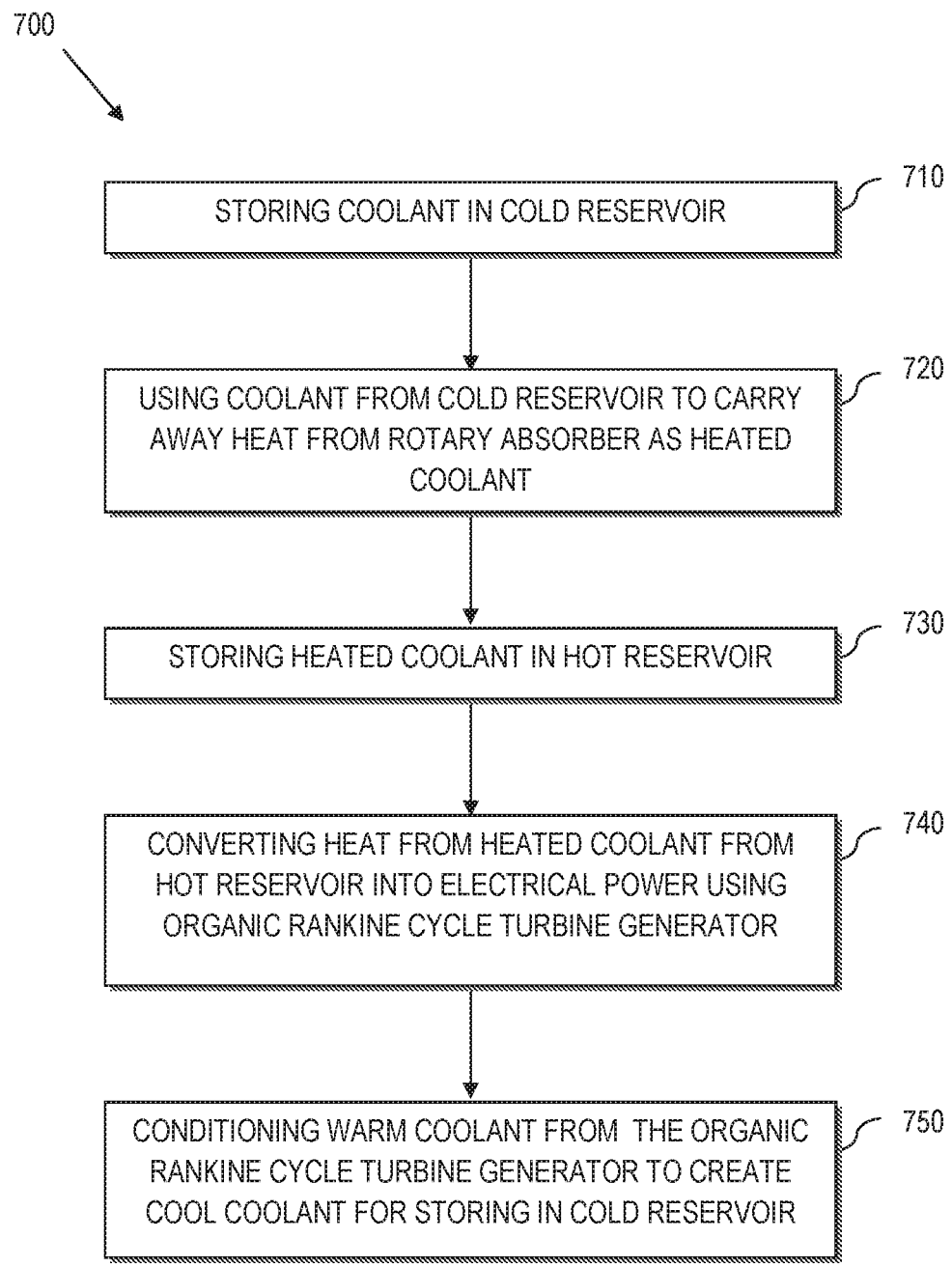
FIG. 7 is a flow chart illustrating a method for testing engines and using heat generated from the testing of the engine for cogeneration of electrical power, according to various aspects of the present disclosure.

Method of Collecting and Using Waste Energy Using a Rotary Absorber:

FIG. 7 is a flow chart illustrating a method 700 for testing an engine, which may be performed by the systems of FIGS. 1-6. At 710, cool coolant is stored in a cold reservoir. (e.g., one or more storage tanks).

At 720, cool coolant from the cold reservoir is used carry away heat from a shaft of an engine under test via a rotary absorber, which heats the cool coolant into heated coolant. At 730, the heated coolant is stored in a hot reservoir, which may be one or more insulated storage tanks. The heated coolant may be supplied to the hot reservoir by a heated-fluid supply pump, which in turn may be controlled by a control unit that determines a required flow rate for the test and sets the heated-fluid supply pump to that flow rate. The control unit may be the same control unit as the cool-fluid control unit may work in conjunction with the cool-fluid control unit, or may be independent of the cool-fluid control unit.

At 740, heat from the heated coolant is converted into electrical power using an Organic Rankine Cycle (ORC) turbine-generator device, which cools the coolant to create warm coolant, as described more fully herein. The amount of heated coolant supplied to the ORC turbine-generator device may be determined by detecting an electrical load on the ORC turbine-generator device and basing a flow rate on that electrical load.

At 750, the warm coolant is conditioned with a conditioning system by cooling the warm coolant further to create cool coolant, which is stored back in the cold reservoir at 710. A cool-fluid fill pump may be used to return the coolant from the conditioning system to the cold reservoir. The conditioning system may include a dry-air heat exchanger to remove and distribute heat to the air, or the conditioning system may use some other form of heat exchanger with an external cooling supply. Further, the conditioning system may condition the coolant in other ways. For example, the coolant may be treated to maintain a proper pH level and physical chemistry for engine testing. As another example, the coolant may be treated to maintain a proper lubricity for engine testing. As a further example, the coolant may be filtered to remove any impurities introduced anywhere along the method.

Any or all of the pumps, control units, conditioning systems, etc., may be powered by the electrical power produced by the ORC turbine-generator device using heated coolant that was stored in the hot reservoir during the instant test or any previous test. Further, the ORC turbine-generator device may be bypassed by directing the heated coolant through a bypass valve.

Moreover, the electrical power may be supplemented by other generators. For example, heat from the exhaust of the engine under test or from the engine itself may be reclaimed as heat. As another example, flow of exhaust gases may be used to rotate a turbine-generator to create electrical power.

The systems and methods described herein may be used to store energy for later use in cogeneration, because the heated coolant is stored in the hot reservoir to bleed off for later use. This cogenerated electricity may be used to offset some of the power requirements of the system or other systems at a testing facility.

As an example implementation, a turbo-shaft jet engine to be tested may be "dressed" by installing a direct mounted rotary absorber and other items such as intake bell, starter, throttle servo, harnesses, etc. The dressed engine including the rotary absorber is then transported as an assembled unit into the test cell for testing, e.g., using an overhead gantry or other suitable method. Once in the test cell, final hookups may be made. This results in a very efficient workflow and requires relatively small test cells.

Figure 8:
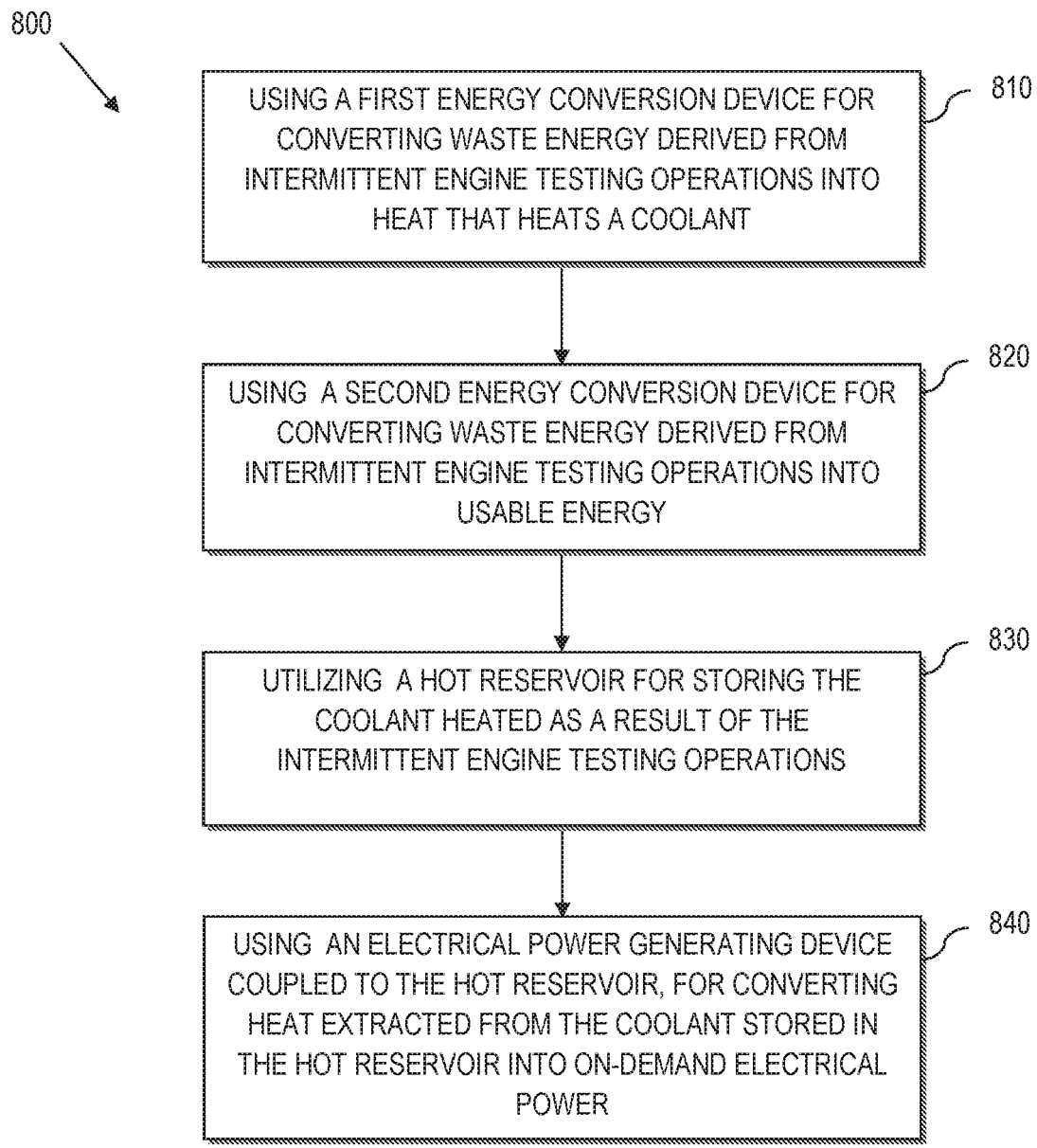
FIG. 8 is a flow chart illustrating another method for testing engines and using heat generated from the testing of the engine for cogeneration of electrical power, according to various aspects of the present disclosure.

FIG. 8 is a flow chart illustrating another method 800 for testing an engine, which may be performed by the systems of FIGS. 1-6. Referring to FIG. 8, according to further aspects of the present disclosure, a method of performing engine testing operations comprises using at 810, a first energy conversion device for converting waste energy derived from intermittent engine testing operations into heat that heats a coolant. The method also comprises using at 820, a second energy conversion device for converting waste energy derived from intermittent engine testing operations into usable energy, where the second energy conversion device operates independently of the first energy conversion device. The method also comprises utilizing at 830, a hot reservoir for storing the coolant heated as a result of the intermittent engine testing operations. The method still further comprises using at 840, an electrical power generating device coupled to the hot reservoir, for converting heat extracted from the coolant stored in the hot reservoir into on-demand electrical power. The method thus defines a primary coolant loop that couples the coolant from the hot reservoir to the electrical power generating device and from the electrical power generating device to the optional conditioning system.

In an example implementation, the method comprises implementing the first energy conversion device as a rotary absorber that provides a variable resistance to rotation of a shaft of an engine under test during the engine testing operation, producing waste energy that heats the coolant transferred from a cold reservoir to the hot reservoir. In addition or alternatively, the method comprises implementing one of the energy conversion devices as an electric generating device that converts shaft power from the rotation of the shaft of the engine under test to electricity, and applying an electrical load to an output of the electric generating device in order to produce resistance.

In addition to any of the above example implementations, or alternatively, the method comprises implementing the second energy conversion device as a turbine-generator that receives exhaust gases from the engine testing operation and converts the exhaust gases into electrical power.

In addition to any of the above example implementations, or alternatively, the method may comprise implementing the second energy conversion device as a gas to liquid heat exchanger and an electrical power generating device. The heat exchanger transfers energy from exhaust gases from the engine testing operation to heat that heats an exhaust coolant. The heat from the exhaust coolant is converted to electricity by the exhaust electrical power generating device. Here, the method comprises forming a high temperature coolant loop that couples the heated exhaust coolant from the gas to liquid heat exchanger to the exhaust electrical power generating device, back to the gas to liquid heat exchanger, where the high temperature coolant loop is independent of the primary coolant loop.

In addition to any of the above example implementations, or alternatively, the method may comprise implementing the second energy conversion device as an engine heat exchanger that transfers waste energy in the form of engine heat to an engine coolant that carries away heat from the engine under test, and a secondary heat exchanger in an ORC turbine-generator device. Here, heat drawn by the ORC turbine-generator device for conversion to electricity is from a combination of heat from the engine coolant and heat from the coolant from the hot reservoir.

In addition to any of the above example implementations, or alternatively, the method may comprise implementing the second energy conversion device as an engine heat exchanger that transfers waste energy in the form of engine heat to an engine coolant that carries away heat from the engine under test, and an engine ORC turbine-generator device that converts heat from heated engine coolant into electrical power.

Figure 9:
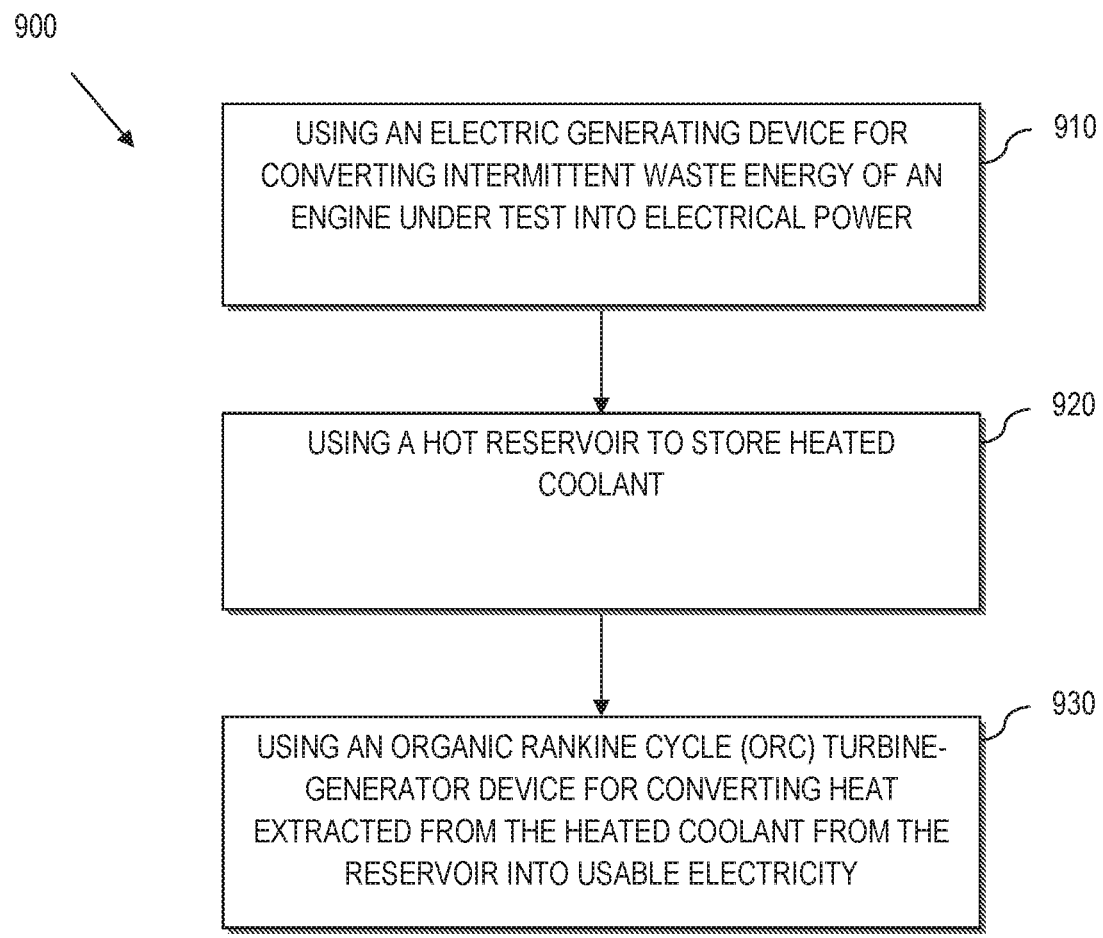
FIG. 9 is a flow chart illustrating yet another method for testing engines and using heat generated from the testing of the engine for cogeneration of electrical power, according to various aspects of the present disclosure.

FIG. 9 is a flow chart illustrating yet another method 900 for testing an engine, which may be performed by the systems of FIGS. 1-6. Referring to FIG. 9, according to still further aspects of the present disclosure, an engine testing method 900 comprises using at 910, an electric generating device (e.g., a turbine-generator or a dynomometer) for converting intermittent waste energy of an engine under test, into electrical power. The method also comprises using at 920, a hot reservoir to store heated coolant, and using at 930, an Organic Rankine Cycle (ORC) turbine-generator device for converting heat extracted from the heated coolant from the reservoir into usable electricity. The method defines a primary coolant loop arranged such that heated coolant flows from the hot reservoir to the ORC turbine-generator device, which converts heat from heated coolant into electrical power. The method also comprises using a resistive load coupled to the electric generating device for converting electrical energy from the electric generating device into heat that is utilized to heat the coolant.

The method may comprise implementing the resistive load as a heating element that heats the coolant in the hot reservoir. As another example, the method may comprise coupling the resistive load to a heat exchanger that transfers heat from the resistive load to a heated working fluid, and using a second loop that transfers the heated working fluid to the ORC turbine-generator device. Still further, the method may comprise using an electric switch that receives the electrical power from the electric generating device and selectively couples the electrical power to a select one of the resistive load and a separate load bank.

Configurations:

The energy capture approaches described more fully herein, including the Primary Waste Energy Capture, Hot Reservoir Heating, Thrust Exhaust Heating Exhaust Loop Heating, Engine Coolant Loop (both variations), Thrust Engine Capture, and Generator/Dynomometer variations can be utilized alone or in any of combination of energy capture approaches, depending upon testing system requirements. Moreover, an overall system configuration can be simplified where less than all of the energy capture approaches are utilized, such as by omitting features that are unique to the non-utilized energy capture approach.

Miscellaneous Considerations:

In an example implementation, in order to capture the maximum amount of energy during an engine testing operation multiple heat exchanger loops (e.g., three or more loops) are utilized. For instance, a brake coolant (e.g., water) may be used in the primary coolant loop 130 to capture energy based upon the fluid passing through the rotary absorber 106. An exhaust coolant loop 314 may utilize an exhaust gas transfer (e.g., organic heat transfer fluid) to capture energy from exhaust from the engine during testing. Engine coolant (e.g., glycol water mixture) may be utilized in an engine coolant loop 326 to capture energy utilized to cool the engine under test.

The loops 130, 314, 326, 502, 610, 614 are physically isolated from each other such that the fluid in each loop is isolated from the fluid in the remaining loops. For example, the engine coolant does not physically contact the exhaust coolant the heated coolant the organic generator fluid of the ORC turbine-generator device 136 or the organic generator fluid of the exhaust ORC turbine-generator device 318, etc. In this regard, suitable piping, tubing, or other suitable conduit may be used to route the flow of fluids described in greater detail herein.

The control unit(s) can divert generated power to the facility, to the power grid and/or to a heating element 302 located inside the hot reservoir 128. Thus if there is no demand for electricity the recovered waste energy is stored as heat energy within the hot reservoir 128. Later, upon demand the ORC turbine-generator device 136 is commanded to generate power using warm coolant pumped from the hot reservoir 128. The other regenerative and bypass functionality are also maintained in this embodiment.

According to aspects of the present disclosure, engine test cells provide improved performance and reliability, enhanced capabilities, better timing, and lower acquisition and operating costs. For instance, a closed system is provided, where a closed circuit conditioned fluid supply does not allow cooling fluid to come in contact with the atmosphere, thus reducing the potential for contamination with less need for additional make-up fluid. Further, automated quality monitoring and conditioning systems can be utilized to filter and adjust the recycled cooling fluid to maintain proper pH level, physical chemistry and lubricity. In this manner, there is no need for toxic chemicals or reagents.

Computer-based dashboard and facility displays can be utilized to highlight energy recapture and savings. Moreover, the test cells herein, may be implemented within the greater test facility without connection to the external utility grid. Thus, energy savings can be fully realized without having to comply with any restrictions imposed by local utility authorities.

In the course of internal combustion engine product development or internal combustion engine manufacturing, repair and/or overhaul operations, engines must be tested to ensure proper function and performance. Internal combustion engine testing can generate large amounts of waste energy. This waste energy is typically dissipated into the atmosphere or other thermal reservoirs such as rivers, lakes or geothermal wells. In addition to creating waste energy, internal combustion engine testing systems often times require the input of substantial additional energy from the utility grid to power pumps, fans, cooling systems, and other facility equipment. Also, the nature of an engine testing facility, especially one that tests large engines or has many test cells, can produce relatively large bursts of power when there may not be a demand for the energy within the local facility. Moreover, utility authorities are not always receptive to or capable of receiving these bursts of intermittent power onto the local grid, especially if an instantaneous demand does not exist. However, the systems herein avoid these issues by capturing and optionally storing waste energy for conversion to usable energy on demand concurrent with testing or at a later time.

Moreover, the "quality" of the waste energy available from conventional internal combustion engine testing strategies may be considered low-grade waste heat. As such, most internal combustion engine testing facilities opt to simply dissipate waste energy to the environment as a "cost of doing business". However, according to aspects of the present disclosure, waste energy recapture methods allow waste energy to be converted into useful energy, e.g., power on demand, even where waste energy is "low quality". The generated electricity can defray the cost of testing and satisfy other environmental and economic requirements.

Also, in some applications, the methods described herein can earn so-called "carbon credits" having direct or indirect monetary value for converting waste energy to useful forms of energy that would have otherwise resulted in greenhouse gases being released into the atmosphere without generating useful work.

Moreover, the systems herein can eliminate or reduce the additional input energy to power the testing facilities. Perhaps the most useful form of converted waste energy is electricity, which is ubiquitous and can be readily used by a multitude of applications, including using the generated electricity to power the testing system itself, powering other features of the test facility, combinations thereof, etc.

Flowchart and block diagrams in the Figures illustrate the architecture, functionality, and operation of possible implementations of systems and methods according to various embodiments of the present disclosure. In some implementations, the functions noted in the block may occur out of the order noted in the figures. For example, two blocks shown in succession may, in fact, be executed substantially concurrently, or the blocks may sometimes be executed in the reverse order, depending upon the functionality involved.

The terminology used herein is for the purpose of describing particular embodiments only and is not intended to be limiting of the disclosure herein. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description herein has been presented for purposes of illustration and description, but is not intended to be exhaustive or limited to the form disclosed. Many modifications and variations will be apparent to those of ordinary skill in the art without departing from the scope and spirit of the disclosure. Aspects of the disclosure were chosen and described in order to best explain the principles of operation and the practical application, and to enable others of ordinary skill in the art to understand the various embodiments with various modifications as are suited to the particular use contemplated.

What is claimed is:

1. An engine testing system, comprising:
   a first energy conversion device that converts waste energy derived from intermittent engine testing operations into heat that heats a coolant, wherein the first energy conversion device comprises:
      a gas to liquid heat exchanger that transfers energy from exhaust gases from the engine testing operation to heat that heats an exhaust coolant;
      an exhaust electrical power generating device; and
      a high temperature coolant loop that couples the heated exhaust coolant from the gas to liquid heat exchanger to the exhaust electrical power generating device, back to the gas to liquid heat exchanger, where the high temperature coolant loop is independent of the primary coolant loop;
      wherein: the exhaust electrical power generating device converts heat extracted from the exhaust coolant into electrical power;
   a second energy conversion device that converts waste energy derived from intermittent engine testing operations into usable energy, where the second energy conversion device operates independently of the first energy conversion wherein the second energy conversion device comprises:
   a turbine-generator that receives exhaust gases from the engine testing operation and converts the exhaust gases into electrical power that is selectively coupled to a heating element that heats the coolant in the hot reservoir;
   a hot reservoir that stores the coolant heated as a result of the intermittent engine testing operations;
   an electrical power generating device coupled to the hot reservoir, which converts heat extracted from the coolant stored in the hot reservoir into on-demand electrical power, wherein the electrical power generating device:
      includes an evaporator, a turbine, a recirculation pump, and a regenerator; and
      is separate from the hot reservoir; and
   a primary coolant loop that couples the coolant from the hot reservoir to the electrical power generating device.

2. The engine testing system of claim 1, wherein:
   the first energy conversion device comprises a rotary absorber that provides a variable resistance to rotation of a shaft of an engine under test during the engine testing operation, producing waste energy that heats the coolant transferred from a cold reservoir to the hot reservoir.

3. The engine testing system of claim 1, wherein:
a select one of the first energy conversion device and the second energy conversion device comprises a rotary absorber implemented as an electric generating device that converts the shaft power from the rotation of the shaft of the engine under test to electricity, and an electrical load applied to an output of the electrical generator device in order to produce resistance.

4. The engine testing system of claim 1, wherein the second energy conversion device comprises:
a turbine-generator that receives exhaust gases from the engine testing operation and converts the exhaust gases into electrical power.

5. The engine testing system of claim 1, wherein the second energy conversion device comprises:
a gas to liquid heat exchanger that transfers energy from exhaust gases from the engine testing operation to heat that heats an exhaust coolant;
an exhaust electrical power generating device; and
a high temperature coolant loop that couples the heated exhaust coolant from the gas to liquid heat exchanger to the exhaust electrical power generating device, back to the gas to liquid heat exchanger, where the high temperature coolant loop is independent of the primary coolant loop;
wherein:
the exhaust electrical power generating device converts heat extracted from the exhaust coolant into electrical power.

6. The engine testing system of claim 1, wherein the second energy conversion device comprises:
an engine heat exchanger that transfers waste energy in the form of engine heat to an engine coolant that carries away heat from the engine under test; and
a secondary heat exchanger in the ORC turbine-generator device, such that heat drawn by the ORC turbine-generator device for conversion to electricity is from a combination of heat from the engine coolant and heat from the coolant from the hot reservoir.

7. The engine testing system of claim 1, wherein the second energy conversion device comprises:
an engine heat exchanger that transfers waste energy in the form of engine heat to an engine coolant that carries away heat from the engine under test; and
an engine ORC turbine-generator device that converts heat from heated engine coolant into electrical power.

8. An engine testing system, comprising:
a first energy conversion device that converts waste energy derived from intermittent engine testing operations into heat that heats a coolant; coolant, wherein the first energy conversion device comprises:
an engine heat exchanger that transfers waste energy in the form of engine heat to an engine coolant that carries away heat from the engine under test; and
an engine ORC turbine-generator device that converts heat from heated engine coolant into electrical power;
a second energy conversion device that converts waste energy derived from intermittent engine testing operations into usable energy, where the second energy conversion device operates independently of the first energy conversion device; device, wherein the second energy conversion device comprises at least one of:
a turbine-generator system having:
a turbine-generator that receives exhaust gases from the engine testing operation and converts the exhaust gases into electrical power that is selectively coupled to a heating element that heats the coolant in the hot reservoir; and
an exhaust heat system having:
a gas to liquid heat exchanger that transfers energy from exhaust gases from the engine testing operation to heat that heats an exhaust coolant;
an exhaust electrical power generating device; and
a high temperature coolant loop that couples the heated exhaust coolant from the gas to liquid heat exchanger to the exhaust electrical power generating device, back to the gas to liquid heat exchanger, where the high temperature coolant loop is independent of the primary coolant loop;
wherein the exhaust electrical power generating device converts heat extracted from the exhaust coolant into electrical power;
a hot reservoir that stores the coolant heated as a result of the intermittent engine testing operations;
an electrical power generating device coupled to the hot reservoir, which converts heat extracted from the coolant stored in the hot reservoir into on-demand electrical power, wherein the electrical power generating device:
includes an evaporator, a turbine, a recirculation pump, and a regenerator; and
is separate from the hot reservoir; and
a primary coolant loop that couples the coolant from the hot reservoir to the electrical power generating device.

* * * * *